US007554632B2

(12) United States Patent
Tanaka et al.

(10) Patent No.: US 7,554,632 B2
(45) Date of Patent: *Jun. 30, 2009

(54) LIQUID CRYSTAL DEVICE AND ELECTRONIC APPARATUS PROVIDED WITH THE SAME

(75) Inventors: Chihiro Tanaka, Matsumoto (JP); Tadashi Tsuyuki, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/906,976

(22) Filed: Oct. 4, 2007

(65) Prior Publication Data

US 2008/0068542 A1 Mar. 20, 2008

Related U.S. Application Data

(60) Continuation of application No. 11/389,653, filed on Mar. 24, 2006, now Pat. No. 7,295,269, which is a division of application No. 11/008,803, filed on Dec. 9, 2004, now Pat. No. 7,161,646, which is a continuation of application No. 09/953,088, filed on Sep. 14, 2001, now Pat. No. 6,839,105.

(30) Foreign Application Priority Data

Sep. 14, 2000 (JP) .............................. 2000-280806
Aug. 23, 2001 (JP) .............................. 2001-253472

(51) Int. Cl.
*G02F 1/1335* (2006.01)
*G02F 1/133* (2006.01)

(52) U.S. Cl. ........................ 349/113; 349/110; 349/114

(58) Field of Classification Search ................. 349/110, 349/113–114, 122
See application file for complete search history.

(56) References Cited

U.S. PATENT DOCUMENTS

| 4,241,984 A | 12/1980 | Leibowitz |
| 4,315,258 A | 2/1982 | McKnight et al. |
| 4,935,757 A | 6/1990 | Hatano et al. |
| 5,367,390 A | 11/1994 | Scheffer et al. |
| 5,680,188 A | 10/1997 | Yoshida et al. |
| 5,699,135 A | 12/1997 | Hisatake et al. |
| 5,905,553 A | 5/1999 | Matsukawa et al. |
| 5,936,688 A | 8/1999 | Tsuda et al. |
| 5,940,157 A | 8/1999 | Nakamura et al. |
| 6,104,460 A | 8/2000 | Abe et al. |

(Continued)

FOREIGN PATENT DOCUMENTS

JP    10170959    6/1996

(Continued)

*Primary Examiner*—Dung T. Nguyen
(74) *Attorney, Agent, or Firm*—Harness, Dickey & Pierce, P.L.C.

(57) ABSTRACT

Reflective display and transmissive display are performed by driving liquid crystal in a predetermined area (region b) in a non-crossing region by using an oblique electric field. Light passed through the region b when a voltage is applied is shaded since the liquid crystal in the region b is driven. Accordingly, at a position of a second substrate 2*b* corresponding to the region b, it is not necessary to provide a shading film 22. Consequently, a line width S1 of the shading film 22 can be designed to be smaller compared to that of a conventional one, and hence, a high aperture ratio can be obtained.

4 Claims, 17 Drawing Sheets

U.S. PATENT DOCUMENTS

| | | |
|---|---|---|
| 6,124,909 A | 9/2000 | Miyashita et al. |
| 6,188,456 B1 | 2/2001 | Koma |
| 6,195,140 B1 | 2/2001 | Kubo et al. |
| 6,222,599 B1 | 4/2001 | Yoshida et al. |
| 6,268,895 B1 | 7/2001 | Shimada et al. |
| 6,330,047 B1 | 12/2001 | Kubo et al. |
| 6,462,798 B1 * | 10/2002 | Kim et al. .................. 349/129 |
| 6,839,105 B2 | 1/2005 | Tanaka et al. |

FOREIGN PATENT DOCUMENTS

| | | |
|---|---|---|
| JP | 10-161144 | 6/1998 |
| JP | 11-149079 | 2/1999 |
| WO | WO 99/28782 | 11/1998 |

* cited by examiner

<CASE OF VOLTAGE APPLICATION>

(a)

(b)

LIQUID CRYSTAL DEVICE AND ELECTRONIC APPARATUS PROVIDED WITH THE SAME

CROSS-REFERENCE TO RELATED APPLICATIONS

This application is a continuation of U.S. application Ser. No. 11/389,653 filed Mar. 24, 2006 which is a divisional of U.S. application Ser. No. 11/008,803 filed on Dec. 9, 2004 (U.S. Pat. No. 7,161,646 issued Jan. 9, 2007); which is a continuation of U.S. application Ser. No. 09/953,088, filed on Sep. 14, 2001 (U.S. Pat. No. 6,839,105 issued Jan. 4, 2005); which claims the benefit of foreign applications JPSN 2001-253472, filed Aug. 23, 2001, and JPSN 2000-280806, filed Sep. 14, 2000. The disclosures of the above applications are incorporated herein by reference.

BACKGROUND OF THE INVENTION

1. Technical Field of the Invention

The present invention relates to liquid crystal devices for displaying images such as letters and numerals by modulating light using liquid crystal. The present invention also relates to electronic apparatuses using the liquid crystal devices.

2. Description of the Related Art

In recent years, reflective liquid crystal devices have been frequently used for display units of electronic apparatuses such as mobile apparatuses. Since a light source such as a backlight is not provided in the reflective liquid crystal device, they have enjoyed the advantage of reduced electric power consumption. However, since external light is used as the light source, there has been a problem in that the display cannot be viewed in dark places. In view of the above situation, a transflective liquid crystal device has been provided in which the display can be viewed in bright places using external light similar to the reflective liquid crystal device and can also be viewed in dark places using light emitted from a light source such as a backlight.

FIG. 12 is a view showing a schematic structure of a conventional transflective liquid crystal device 100. The transflective liquid crystal device 100 shown in the figure is an active matrix liquid crystal device using TFD (Thin Film Diode) elements as a switching element.

In this transflective liquid crystal device 100, between an upper substrate 101 and a lower substrate 102 each having transparency and insulating properties, liquid crystal 103 is enclosed by a frame-shaped sealing material (not shown in the figure), and accordingly, a liquid crystal cell 110 is formed.

On the inside surface of the upper substrate 101, a plurality of rectangular pixel electrodes having transparency formed of ITO or the like is provided and is connected to metal wires (not shown in the figure) via the TFD elements. In addition, at the outside surface side of the substrate 101, a polarizer 121 and a retardation film 122 are provided in this order from an observer side.

In addition, at the inside surface side of the lower substrate 102, a transflector 131, a black matrix or a black mask for absorbing light, that is, shading films 132, and counter electrodes 135 are sequentially provided in this order, and at the outside surface side of the lower substrate, a retardation film 142, a polarizer 141, and a backlight 150 are provided. Since other elements (such as color layers, an alignment film, and a protective layer) constituting the transflective liquid crystal device 100 are not specifically necessary for describing display operation of the transflective liquid crystal device, they are not shown in the figures, and the descriptions thereof are omitted.

In the transflective liquid crystal device 100 having the structure described above, when external light from the observer side enters the device while the device is in the white display state, in an electrode existing area at which the pixel electrode 111 is provided on the upper substrate 101, as shown by a light path A, the incident light passes through the polarizer 121, the retardation film 122, the upper substrate 101, the pixel electrode 111, the liquid crystal layer 103, and the counter electrode 135 in this order and reaches the transflector 131, and the light reflected at the transflector 131 retraces the path through which it passed and is emitted from the polarizer 121 to the observer side.

In contrast, in a non-electrode existing area at which the pixel electrode 111 is not provided on the upper substrate 101, incident light is absorbed by the shading film 132 provided at the lower substrate 102 side as shown by a light path B.

In addition, when light is emitted from the backlight 150, in the electrode existing area, as shown by a light path C, the emitted light from the backlight 150 passes through the polarizer 141, the retardation film 142, the lower substrate 102, the transflector 131, the counter electrode 135, the liquid crystal layer 103, the pixel electrode 111, the upper substrate 101, the retardation film 122, and the polarizer 121 in this order and is emitted to the observer side.

In contrast, in the non-electrode existing area, emitted light is absorbed by the shading film 132 provided at the lower substrate 102 side as shown by a light path D.

As described above, in the conventional transflective liquid crystal device 100, a display is created by reflecting the light entered into the liquid crystal layer 103 from the observer side at the transflector 131 when the environment is bright, and on the other hand, when the environment is dark, a transmissive display is created by transmitting the light emitted from the backlight 150 through the transflector 131.

Although the conventional transflective liquid crystal device has an advantage in that a reflective display and a transmissive display can both be created depending on the environment in which it is used, since the light loss rate of the conventional transflective liquid crystal device is high, there has been a problem in that the display image is dark. In addition, as well as the transflective liquid crystal device, it has also been demanded to increase the brightness of the display image of the reflective liquid crystal device and the transmissive liquid crystal device.

In view of the situations described above, the present invention was made, and an object of the present invention is to provide a liquid crystal device having a high aperture ratio and superior display properties and to provide an electronic apparatus provided with the liquid crystal device described above.

SUMMARY OF THE INVENTION (1) To these ends, in a liquid crystal device of the present invention comprising a first electrode, a second electrode opposing and crossing the first electrode, and liquid crystal provided between the first electrode and the second electrode, a shading film is provided outside the crossing region of the first electrode and the second electrode and separated from the crossing region.

According to the liquid crystal device having the structure described above, since the shading film is not provided at a position corresponding to the crossing region of the second electrode nor at a position opposing a region which is a part of the non-crossing region and is in the vicinity of the crossing region described above, the aperture ratio is increased correspondingly to the region described above, and hence, a bright display image can be created.

In the structure described above, when a potential difference is generated between the first electrode and the second electrode, in the region which is a part of the non-crossing region and in the vicinity of the crossing region, an electric field (hereinafter referred to as an oblique electric field) is generated in an oblique direction so as to extend from the crossing region to the non-crossing region. Accordingly, the liquid crystal layer opposing the non-crossing region and corresponding to the area at which the shading film is not provided is driven by the oblique electric field described above.

Accordingly, when a voltage is applied between electrodes of a liquid crystal device which is driven in a normally white mode, the liquid crystal layer opposing the region, which is a part of the non-crossing region of the second electrode and is in the vicinity of the crossing region, is driven, and as a result, light passed through the area described above does not leak outside. That is, shading is performed.

When a liquid crystal is driven using an oblique electric field, there may be a concern in that disclination occurs due to the generation of reverse-tilt domains. Accordingly, areas at which reverse-tilt domains are not generated are studied beforehand even when an oblique electric field is used for driving the liquid crystal, and based on the result of this study, the liquid crystal area at which liquid crystal is driven by an oblique electric field is determined. As described above, by limiting the liquid crystal area which is driven by using an oblique electric field, the occurrence of disclination can be prevented.

(2) Next, in another liquid crystal device of the present invention having the structure of the liquid crystal device described in the above (1), a plurality of the crossing regions may be formed by providing at least a plurality of the first electrodes or at least a plurality of the second electrodes, and the shading film is provided separated from each of a pair of crossing regions adjacent to each.

In a typical liquid crystal device, a plurality of the crossing regions of the first electrodes and the second electrodes is provided. In the structure described above, the shading film may be provided separated from each of the crossing regions. Accordingly, the aperture ratio of the display area of the liquid crystal device can be further increased.

(3) Next, another liquid crystal device of the present invention having the structure of the liquid crystal device described in the above (1) or (2) may further comprise a reflector provided so as to overlap the second electrode in plan view, and the shading film is provided between the second electrode and the reflector.

When a reflective display is created, external light passes through the shading film twice, and hence, sufficient shading can be performed by the shading film. In contrast, when a transmissive display is created, since light only passes through the shading film once, there may be a concern whether sufficient shading can be performed or not. However, as the liquid crystal device of the present invention, when the reflector is provided in addition to the shading film, shading can be reliably performed while transmissive display is performed.

(4) Next, in another liquid crystal device of the present invention having the structure of one of the liquid crystal devices described in the above (1) to (3), the shading film may be provided so as to surround the crossing region described above. That is, an aperture region may be provided in the shading film so as to surround the crossing region.

(5) Next, another liquid crystal device of the present invention having the structure of the liquid crystal device described in the above (3) or (4) may further comprise a color layer provided between the reflector and the second electrode. Accordingly, a color display can be created, and in the case mentioned above, bright color display having a high aperture ratio can be performed.

(6) Next, another liquid crystal device of the present invention having the structure of one of the liquid crystal devices described in the above (1) to (5) may further comprise a lighting device for illuminating the liquid crystal from the second electrode side. Accordingly, a transmissive display can be created by using the lighting device as a backlight, and in the case described above, a bright display can also be created.

(7) Next, in another liquid crystal device of the present invention having the structure of the liquid crystal device described in the above (6), the reflector may be a transflector for reflecting and transmitting incident light in a predetermined ratio. When the transflector is used, there may be a concern in that a display image becomes dark due to an increase in light loss rate; however, when the area at which the shading film exists is decreased as described in the present invention, a bright display can be created even when the transflector is used.

(8) Next, in another liquid crystal device of the present invention having the structure of the liquid crystal device described in the above (7), the reflector may be provided with an open portion therein in the crossing region. Accordingly, since light may be supplied to the liquid crystal layer via this open portion, a reflective display using the reflector or a transmissive display using the open portion may be selectively created.

(9) Next, in another liquid crystal device of the present invention having the structure of one of the liquid crystal devices described in the above (1) to (8), the first electrode may be connected to a switching element, and the shading film may cover the switching element. As the switching element, for example, there may be considered a two-terminal type element such as a TFD element or a three-terminal element such as a TFT element.

This liquid crystal device is an active matrix liquid crystal device having the structure in which a voltage applied to the liquid crystal is controlled for each pixel by the switching element. In the liquid crystal device having this structure, switching elements are preferably covered by the shading film, and as a result, the entire non-crossing regions can be substantially shaded.

(10) Next, in another liquid crystal device of the present invention having the structure of one of the liquid crystal devices described in the above (1) to (9), the first electrode, the second electrode, and the liquid crystal are set in a normally white driving state. The normally white state is an optical state in which when a voltage is not applied between the first electrode and the second electrode with liquid crystal provided therebetween, or when an OFF voltage is applied, white display is performed, that is, transmitted light passes through a polarizer and is then viewed from the outside.

In the liquid crystal device set in a normally white driving state, when an ON voltage is applied, an oblique electric field is generated in the non-crossing region in the vicinity of the crossing region, and liquid crystal in this non-crossing region is driven. Accordingly, even when the shading film is not provided corresponding to this non-crossing region, light leakage to the outside can be prevented. That is, shading can be performed.

(11) Next, in another liquid crystal device of the present invention having the structure of one of the liquid crystal devices described in the above (1) to (10), the reflector may also be used as the first electrode or the second electrode or may be connected to the first electrode or the second electrode.

(12) Next, in another liquid crystal device of the present invention comprising a first electrode, a second electrode opposing and crossing the first electrode, and liquid crystal provided between the first electrode and the second electrode, a shading film is provided outside the crossing region of the first electrode and the second electrode and separated from the crossing region, wherein the liquid crystal is driven by an electric field generated between the first electrode and the second electrode, and an oblique electric field is applied to the liquid crystal existing in an area corresponding to the space formed between the shading film and the crossing region.

Since the liquid crystal in the area described above is driven by an oblique electric field, light is not allowed to pass through this area, and as a result, without providing the shading film at a position corresponding to the non-crossing region in the vicinity of the crossing region, shading can be performed by controlling the orientation of the liquid crystal.

(13) Next, another liquid crystal device of the present invention comprises a first substrate and a second substrate opposing each other with a liquid crystal layer provided therebetween, a first electrode provided on a surface of the first substrate at the liquid crystal layer side, a second electrode which is provided on a surface of the second substrate at the liquid crystal layer side and has a crossing region crossing the first electrode and a non-crossing region not crossing the first electrode, a reflector for reflecting light incident from the outside of the first substrate or incident from the outside of the second substrate, and a shading film which is provided on a surface at the liquid crystal layer side of one of the first substrate and the second substrate and which has an aperture region having an area corresponding to areas of the crossing region of the second electrode and of a region which is a part of the non-crossing region and is in the vicinity of the crossing region.

In the liquid crystal device having the structure described above, since the shading film has an aperture region corresponding to the crossing region of the second electrode and the region which is a part of the non-crossing region and is in the vicinity of the crossing region described above, the aperture ratio is increased, and hence, a bright display image can be created.

When a potential difference is generated between the first electrode and the second electrode, the liquid crystal layer opposing the non-crossing region and corresponding to the aperture region is driven by an oblique electric field which is generated so as to extend from the crossing region to the non-crossing region. Accordingly, when a voltage is applied to a liquid crystal device which is driven in a normally white mode, the liquid crystal layer opposing the region which is a part of the non-crossing region and is in the vicinity of the crossing region is also driven, and hence, light passed through this non-crossing region described above is not leaked outside.

In the case in which liquid crystal is driven using an oblique electric field, there may be a concern in that disclination occurs due to the generation of reverse-tilt domains. Accordingly, areas at which reverse-tilt domains are not generated are studied beforehand even when an oblique electric field is used for driving the liquid crystal, and based on the result of this study, a liquid crystal area at which the liquid crystal is driven by an oblique electric field is determined. As described above, by determining the liquid crystal area at which liquid crystal is driven by an oblique electric field, the occurrence of disclination can be prevented.

(14) Next, in another liquid crystal device of the present invention having the structure of the liquid crystal device described in the above (13), in response to the generation of a potential difference between the first electrode and the second electrode, the liquid crystal layer opposing the non-crossing region and corresponding to the aperture region may be driven by an electric field which is generated in an oblique direction so as to extend from the crossing region to the non-crossing region.

(15) Next, in another liquid crystal device of the present invention having the structure of the liquid crystal device described in the above (13) or (14), the reflector may be provided with an open portion for allowing light incident from the side opposite to the liquid crystal layer with respect to the second substrate to pass through.

(16) Next, in another liquid crystal device of the present invention having the structure of one of the liquid crystal devices described in the above (13) to (15), the first electrode may be a plurality of pixel electrodes formed on the first substrate, the second electrode may be a plurality of counter electrodes in a stripe pattern formed on a surface at the liquid crystal layer side of the second substrate, and the counter electrodes each has a sufficient electrode width to cross at least the entire surface of each of the pixel electrodes.

(17) Next, another liquid crystal device of the present invention having the structure of one of the liquid crystal devices described in the above (13) to (16) may further comprise a lighting device disposed at a side opposite to the liquid crystal layer with respect to the second substrate.

(18) Next, in an electronic apparatus according the present invention comprising a liquid crystal device and a container for receiving the liquid crystal device therein, the liquid crystal device is a liquid crystal device according to one of the above (1) or (17).

DETAILED DESCRIPTION OF THE PREFERRED EMBODIMENTS

Hereinafter, with reference to the figures, embodiments of the present invention will be described. Although the embodiments described below are modes of the present invention, the present invention is not limited thereto, and modifications may be optionally made without departing from the scope of the present invention.

Figure 1:
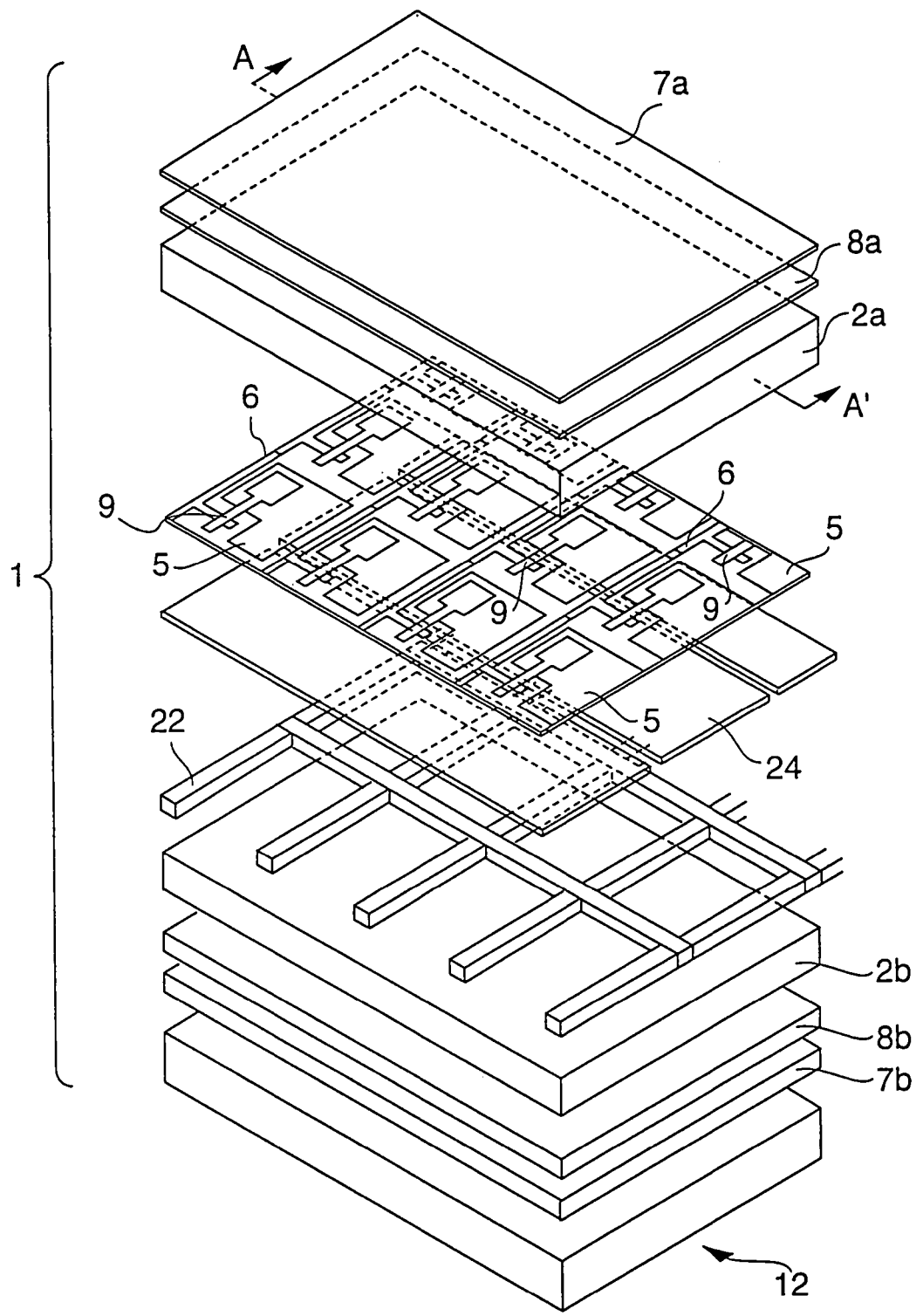
FIG. 1 is a perspective view showing a schematic structure of a transflective liquid crystal device of an embodiment according to the present invention.
Figure 2:
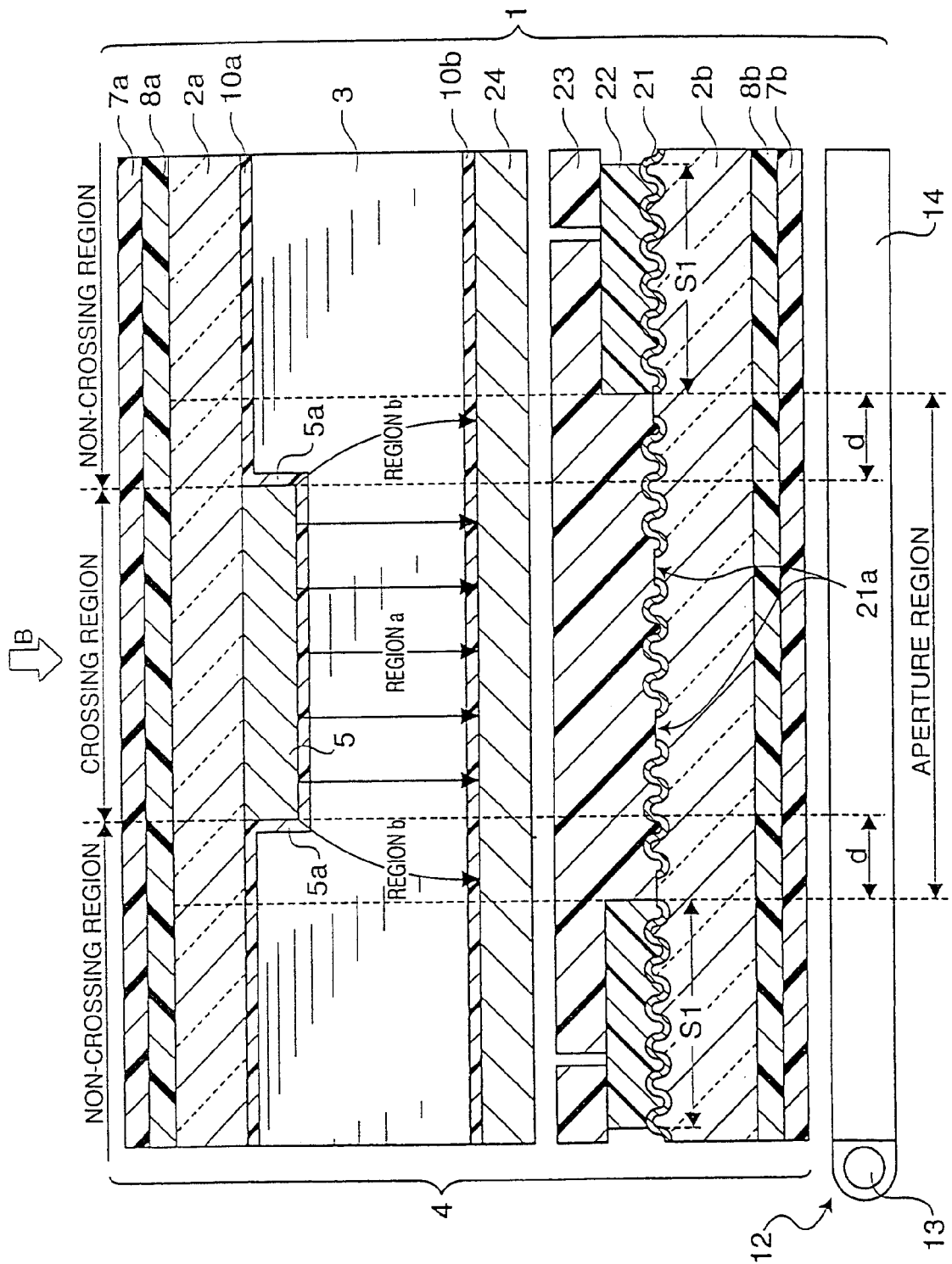
FIG. 2 is a view showing a cross-sectional structure of the liquid crystal device along the line A-A' in FIG. 1.

FIG. 1 is a perspective view showing a schematic structure of a transflective liquid crystal device 1 according to this embodiment, and FIG. 2 is a cross-sectional view taken along the line A-A' of the transflective liquid crystal device 1 shown in FIG. 1. In FIG. 2, for the convenience of illustration, only one pixel electrode 5 is shown in the figure; however, in the actual liquid crystal device, a plurality of pixel electrodes 5 are formed on a first substrate 2a. In addition, the transflective liquid crystal device 1 of this embodiment is an active matrix liquid crystal device using two-terminal switching elements represented by TFD (Thin Film Diode) elements; however, it is not intended that this embodiment is limited thereto, and this embodiment may also be applied to, for example, an active matrix liquid crystal device using three-terminal switching elements represented by TFT (Thin Film Transistor) elements or a passive matrix liquid crystal device.

As shown in FIGS. 1 and 2, in this transflective liquid crystal device 1, between a first substrate 2a and a second substrate 2b each having transparency and insulating properties, a liquid crystal layer 3 composed of nematic liquid crystal having a predetermined twist angle is enclosed by a frame-shaped sealing material (not shown in the figure), and hence, a liquid crystal cell 4 is formed.

On the inside surface of the first substrate 2a, a plurality of rectangular pixel electrodes 5 having transparency composed of ITO or the like is formed, and each pixel electrode 5 is connected to a metal wire 6 via a two-terminal switching element such as a TFD element 9. On the surfaces of the pixel electrodes 5, an alignment film 10a is formed, and this alignment film 10a is processed by a rubbing treatment in a predetermined direction. In addition, at the outside surface side of the first substrate 2a, a polarizer 7a and a retardation film 8a are formed in this order from the upper side in the figure.

In addition, at the inside surface side of the second substrate 2b, transflector 21, shading films 22 formed as a black matrix or a black mask, color layers 23, counter electrodes 24 used as second electrodes, and an alignment film 10b are sequentially formed in this order.

The counter electrode 24 is composed of the same material as that for the pixel electrode 5 formed on the first substrate 2a, that is, the counter electrode is composed of a conductive layer having transparency composed of ITO or the like, and is formed in a strip shape, when viewed in the direction indicated by an arrow B, so as to cross each pixel electrode 5 in the lateral direction in FIG. 2. On the surfaces of the counter electrodes 24, similar to the pixel electrode 5 described above, an alignment film 10b is formed, and this alignment film 10b is processed by rubbing treatment in a predetermined direction.

The color layer 23 has a predetermined pattern such as a delta arrangement of three colors, R (red), G (green), and B (blue). The shading film 22 is formed of a shading material such as chromium or chromium oxide and serves to prevent a decrease in contrast by shading light. A line width S1 of the shading film 22 of this embodiment is designed to be smaller than a line width S0 of the shading film 132 used in the conventional liquid crystal device 100 shown in FIG. 12 by a length "d". The shading film 22 thus designed is provided at a distance "d" from the crossing region (that is, the area where the electrodes exist) of the pixel electrode 5 and the counter electrode 24.

The transflector 21 is formed of a metal layer having reflectivity composed of, for example, aluminum or silver, and the transflector reflects the light incident from the first substrate 2a and allows the light emitted from a lighting device 12 to pass through. In the transflector 21, there are provided open portions 21a which are in the form of, for example, a fine square aperture or a rectangular slit, or which are formed of fine defects or the like dotted in the transflector 21. Accordingly, the light emitted from the lighting device 12 is allowed to pass through the transflector.

At the outside surface side of the lower substrate 2b, a polarizer 7b and a retardation film 8b are provided in this order from the lower side in FIG. 2. In addition, behind the polarizer 7b (that is, the lower side in FIG. 2), the lighting device 12 is disposed which has a fluorescent tube 13 emitting white light and a light guide plate 14 having edges along the fluorescent tube 13 for receiving light. In this embodiment, the lighting device 12 is used as a backlight.

The light guide plate 14 is a transparent plate composed of an acrylic resin or the like having a roughened surface on the entire backside of the plate for scattering light and is formed for receiving light emitted from the fluorescent tube 13 at the edges in order to emit approximately uniform light to the upper side in FIG. 2. As a light source, in addition to the fluorescent tube 13, a LED (light emitting diode), EL (electroluminescence), or the like may be used.

The transflective liquid crystal device 1 according to this embodiment is primarily formed of the constituent elements described above. Next, operation will be described with reference to FIGS. 1 to 3 when a voltage is applied to the transflective liquid crystal device 1 having the structure described above.

Figure 3:
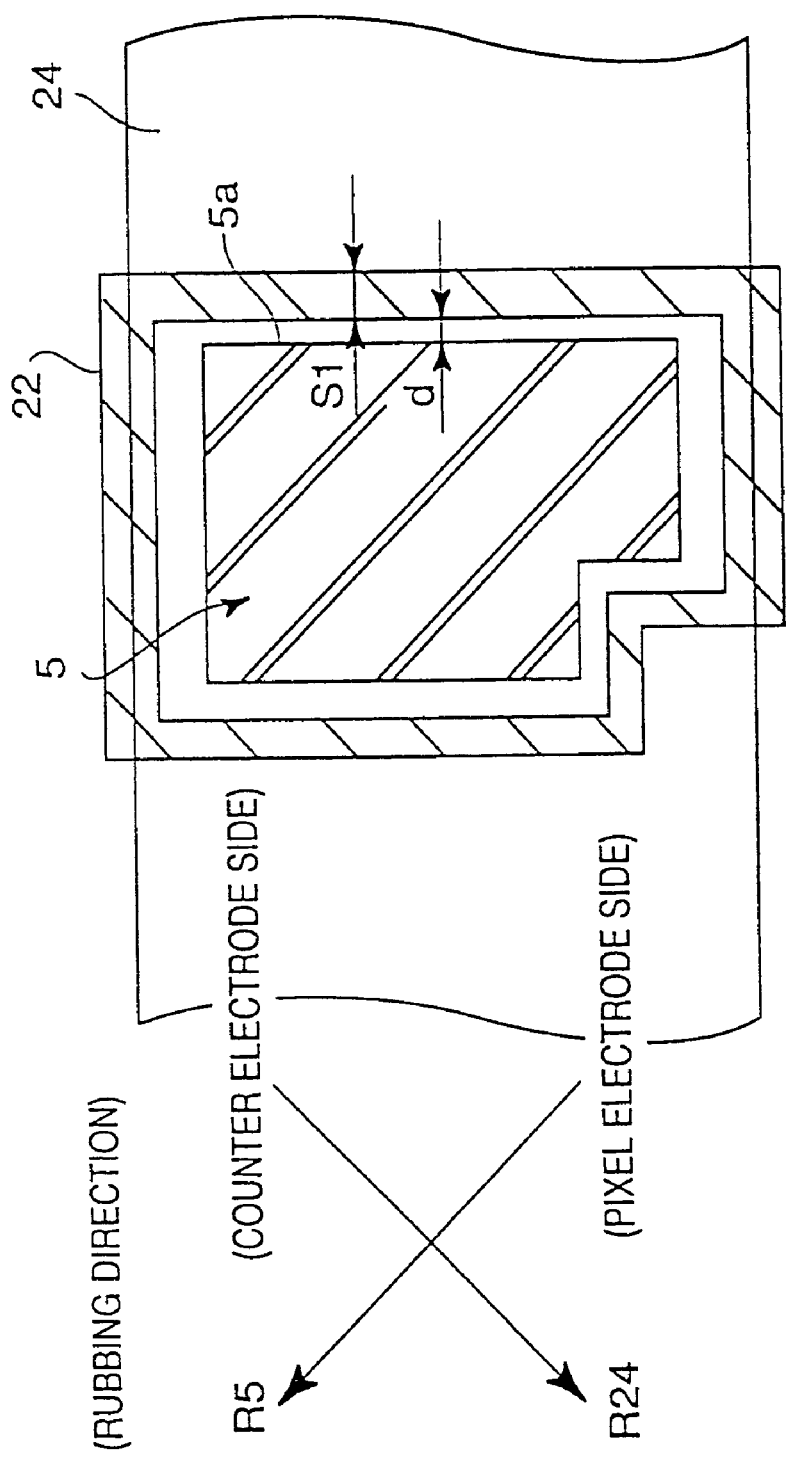
FIG. 3 is a plan view for illustrating an electrode arrangement in one pixel of the liquid crystal device shown in FIG. 1.

FIG. 3 is a plan view for illustrating the arrangement of electrodes provided in one pixel in the display area of the transflective liquid crystal device 1. As described above, on the surface of the pixel electrode 5 and on the surface of the counter electrode 24, the alignment films 10a and 10b (see FIG. 2) are formed, respectively, and a rubbing treatment, that is, a treatment for determining the orientation direction of liquid crystal molecules when no voltage is applied thereto, is performed for the alignment films 10a and 10b.

As can be seen in FIGS. 1-3 the pixel electrodes 5 are formed in an array of spaced rectangular patterns whereas the counter electrodes 24 are in the form of planar strips or sheets that vertically overlap one or more of the individual pixel electrodes 5. These overlapping regions are often referred to as crossing regions in this description even though they do not physically touch each other, the pixel electrodes 5 and counter electrodes 24 being vertically separated by liquid crystal layer 3. Thus, the terms overlapping regions and crossing regions should be construed the same.

In this embodiment, since the rubbing direction R5 for the pixel electrode 5 and the rubbing direction R24 for the counter electrode 24 are orthogonal to each other, the liquid crystal molecules ranging between the electrodes are controlled to be gradually twisted so as to form an angle of 90°. The liquid crystal cell described above is generally called a TN cell, and the liquid crystal molecules enclosed in this liquid crystal cell each have a small tilt angle (that is, a pretilt angle) along the rubbing direction.

When a voltage is applied between the pixel electrode 5 and the counter electrode 24, as shown in FIG. 2, an electric field is generated in the crossing region in the direction perpendicular to both substrates 2a and 2b. In addition, in the non-crossing region (that is, in non-electrode existing area), an electric field (hereinafter referred to as an oblique electric field) is generated in an oblique direction so as to extend from the crossing region to the non-crossing region.

In this embodiment, the liquid crystal is twisted at 90°. This is because it puts emphasis on a transmissive display mode. To put emphasis on a transmissive display mode on a transflective liquid crystal device with switching elements, such as TFD elements or TFT elements, the twisted angle is set between 55° or more and less than 120°. On the contrary, to make displays with an emphasis on a reflective display mode, the twisted angle is set between 0° or more and less than 80°. Further, an angle between 20° or more and less than 70° makes balanced displays possible in both the transmissive display mode and reflective display mode. To set these kinds of twisted angles, the crossing angle of rubbing directions R5 and R24 is set so as to achieve the desired twisted angle.

As a result, the orientation directions of the liquid crystal molecules (region a) in the crossing region and the liquid crystal molecules (region b) in a region which is a part of the non-crossing region and is in the vicinity of the crossing region are changed so as to increase the pretilt angle toward the generated electric field, and hence, the twisted state of the liquid crystal molecules disappears. Since a transmissive state of light incident on the liquid crystal layer 3 is changed in accordance with the change in orientation direction of the liquid crystal molecules in the liquid crystal layer 3, when the electric field intensity is controlled by adjusting a voltage applied between the pixel electrode 5 and the counter electrode 24, a desired transmittance can be obtained.

In the transflective liquid crystal device 1 of this embodiment, a transmissive display and a reflective display are created by driving the liquid crystal using not only the electric field generated perpendicular to both substrates 2a and 2b but also using the oblique electric field generated so as to extend from the crossing region to the non-crossing region.

However, when the liquid crystal is driven by using an oblique electric field, there may be a concern in that display defects (that is, disclination) occur due to the generation of reverse-tilt domains (that is, the generation of an area in which liquid crystal molecules stand up in the direction opposite to that in which the liquid crystal molecules should stand up). Accordingly, regions at which reverse-tilt domains are not generated are studied beforehand even when an oblique electric field is used for driving liquid crystal molecules, and based on the result of this study, the region b (that is, the area at which liquid crystal molecules are driven by using an oblique electric field) is determined. As described above, by determining the region b, the occurrence of disclination can be prevented.

Next, display operation of a transflective liquid crystal device 1 having a determined area for driving liquid crystal by an oblique electric field will be described with reference to FIGS. 4 to 7.

Figure 4:
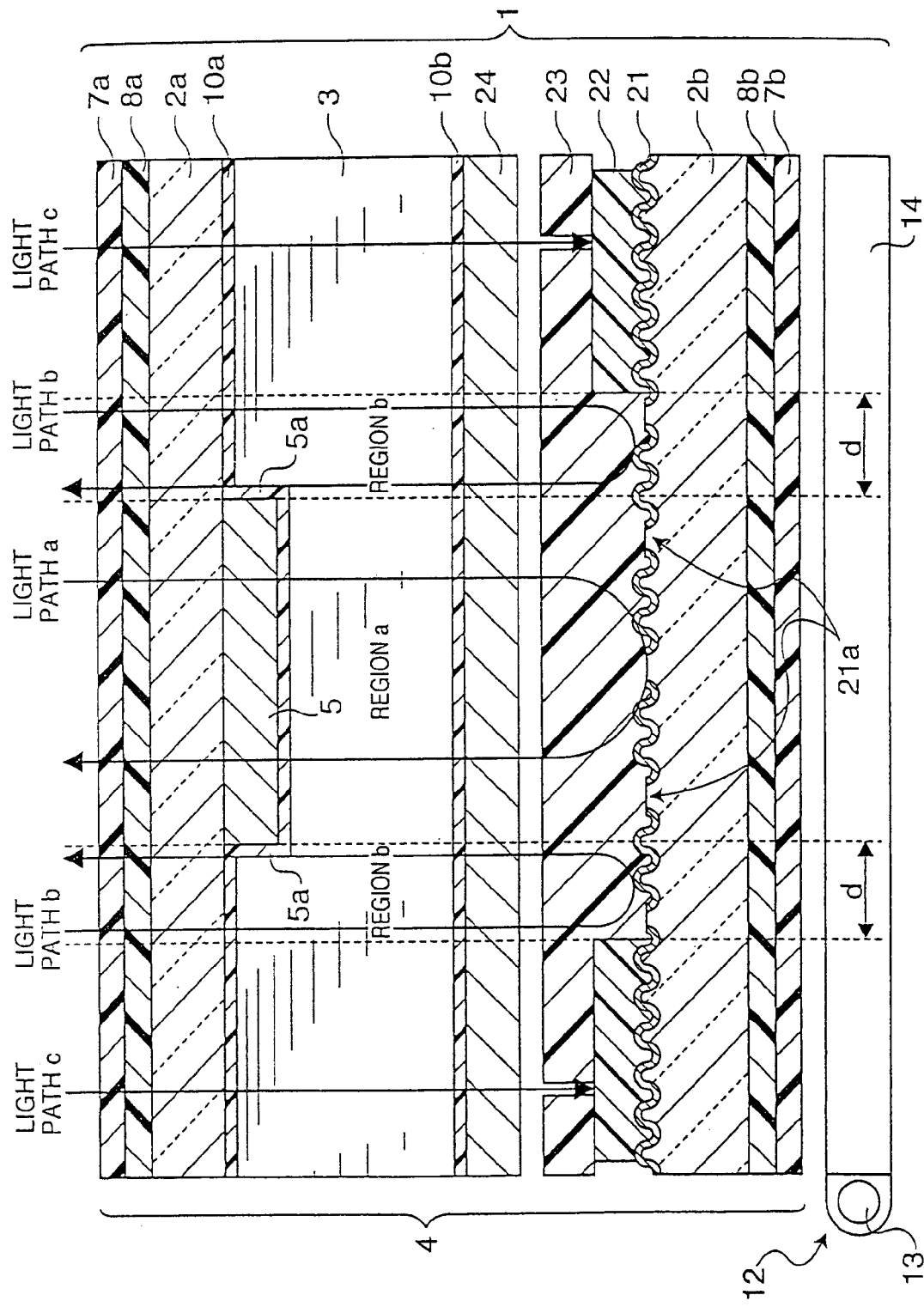
FIG. 4 is a view for illustrating reflective display operation when a voltage is not applied to the liquid crystal device shown in FIG. 1.
Figure 5:
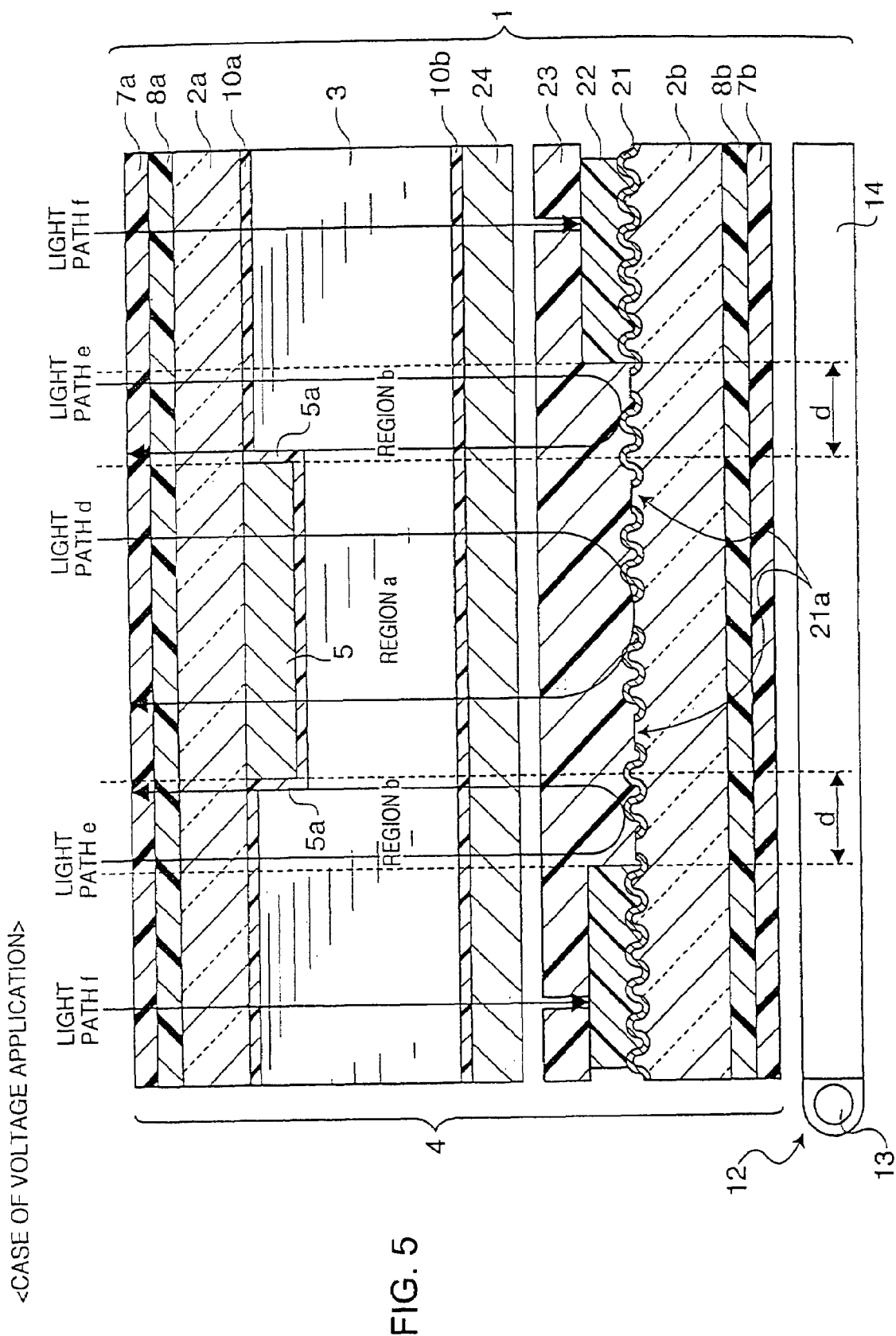
FIG. 5 is a view for illustrating reflective display operation when a voltage is applied to the liquid crystal device shown in FIG. 1.
Figure 6:
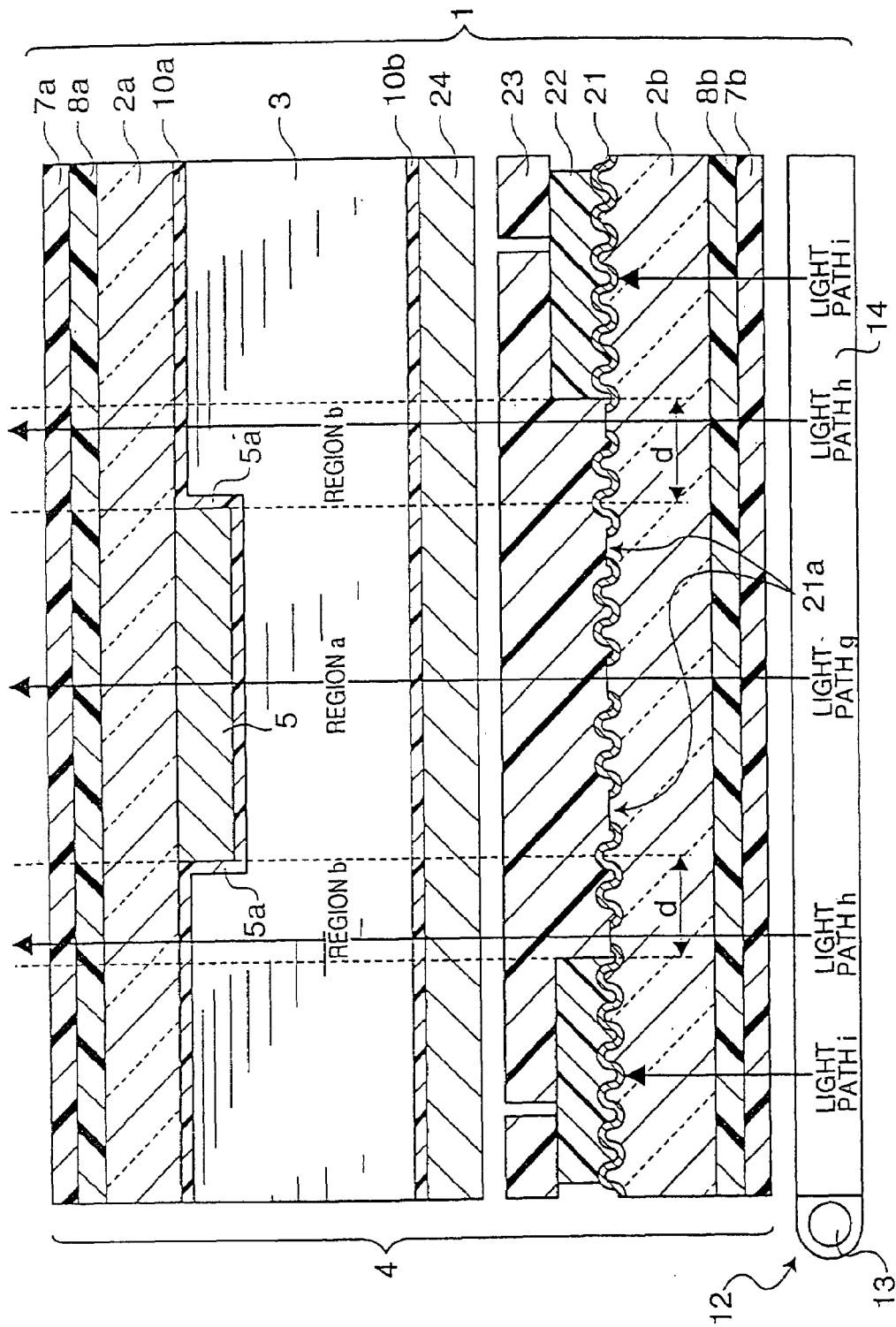
FIG. 6 is a view for illustrating transmissive display operation when a voltage is not applied to the liquid crystal device shown in FIG. 1.
Figure 7:
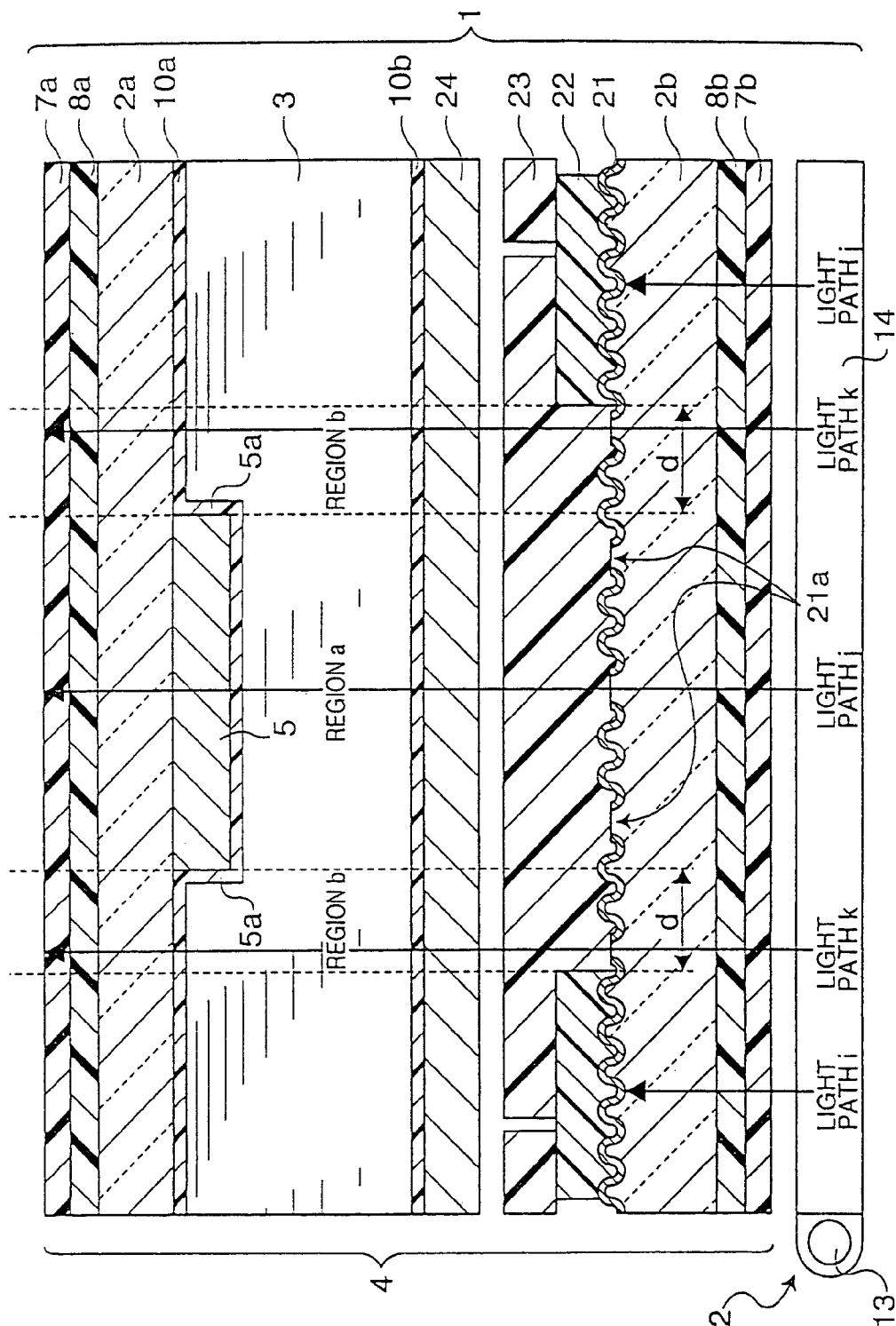
FIG. 7 is a view for illustrating transmissive display operation when a voltage is applied to the liquid crystal device shown in FIG. 1.

FIGS. 4 and 5 are views for illustrating reflective display operation, and FIGS. 6 and 7 are views for illustrating transmissive display operation. In FIGS. 4 to 7, in order to avoid complicated figures, only constituent elements necessary for description are shown in the figure, and the other constituent elements are omitted. In addition, the description below is based on the case in which the device is driven in a normally white mode.

As shown in FIG. 4, in the case in which external light enters the liquid crystal cell from the observer side when no voltage is applied, the external light passes through the polarizer 7a, the retardation film 8a, and the like and further passes through the liquid crystal layer 3. External light passed through the liquid crystal layer 3 other than that absorbed by the shading film 22 shown by a light path c reaches the transflector 21, and the light reflected at the transflector 21 retraces the path through which it passed and is emitted from the polarizer 7a to the observer side (a light path a and a light path b in FIG. 4).

As described above, in the transflective liquid crystal device 1 according to this embodiment, among the external light rays incident from the observer side, in addition to the light passed through liquid crystal (region a) in the crossing region, the light passed through liquid crystal (region b) in a region of a part of the non-crossing region is emitted to the observer side via the polarizer 7a.

In contrast, when a voltage is applied between the pixel electrode 5 and the counter electrode 24, in FIG. 5, an electric field is generated in the crossing region in the direction perpendicular to both substrates 2a and 2b, and an oblique electric field is also generated in the non-crossing region so as to extend from the crossing region to the non-crossing region.

Accordingly, liquid crystal molecules not only in the region a but also in the region b stand up along the electric field and are oriented in the same direction. As a result, as shown by light paths d and e in FIG. 5, external light passed through the region a is absorbed by the polarizer 7a, and in addition, external light passed through the region b is also absorbed by the polarizer 7a. In addition, external light incident from a position opposing the shading film 22 is absorbed by the shading film 22 as shown by a light path f in FIG. 5 as in the case described above. As described above, in the case in which external light enters the liquid crystal cell from the observer side when a voltage is applied, the whole external light is substantially absorbed by the polarizer 7a, the shading film 22, and the like. Consequently, light leakage to the observer side does not occur.

Next, transmissive display will be described with reference to FIGS. 6 and 7. As shown in FIG. 6, in the case in which light is emitted from the lighting device 12 when no voltage is applied, light passed through the polarizer 7b and the retardation film 8b becomes predetermined polarized light and passes through the open portions 21a provided in the transflector 21. An area of the transflector 21 other than the open portions 21a serves as a shading film for shading light emitted from the lighting device 12.

Light passed through the open portions 21a other than that absorbed by the shading film 22 shown by a light path i enters the liquid crystal layer 3 via the color layer 23 and the counter electrode 24, and after the light passes through the liquid crystal layer 3, it is emitted to the observer side via the retardation film 8a and the polarizer 7a as shown by a light path g and a light path h.

In contrast, when a voltage is applied, as described above, an electric field is generated in the crossing region in the direction perpendicular to both substrates 2a and 2b as shown in FIG. 7, and in addition, an oblique electric field is also generated in the non-crossing region so as to extend from the crossing region to the non-crossing region.

Accordingly, liquid crystal molecules not only in the region a but also in the region b stand up along the electric field and are oriented in the same direction. As a result, as shown by a light paths j, the light which is emitted from the lighting device 12 and passes through the region a is absorbed by the polarizer 7a, and in addition, the emitted light passed through the region b is also absorbed by the polarizer 7a as shown by a light path k.

In addition, external light incident from a position opposing the shading film 22 is absorbed by the shading film 22 as shown by a light path I as in the case described above. As described above, in the case in which light is emitted from the lighting device 12 when a voltage is applied, the whole emitted light is substantially absorbed by the polarizer 7a, the shading film 22, and the like. Consequently, light leakage to the observer side does not occur.

As described above, the transflective liquid crystal device 1 of this embodiment performs reflective display and transmissive display by driving liquid crystal (region a) in the crossing region and liquid crystal (region b) in a region which is a part of the non-crossing region and which is in the vicinity of the crossing region. In this device, light passed through the region b when a voltage is applied is absorbed by the polarizer 7a and the like since the liquid crystal in the region b is driven. Accordingly, at a position of the second substrate 2b corresponding to the region b, it is not necessary to provide the shading film 22. As a result, the line width of the shading film 22 can be designed to be smaller than that of a conventional one, and hence, a high aperture ratio can be obtained. In other words, when reflective display is performed, the brightness of display image can be increased by an increase in reflectance, and when transmissive display is performed, the brightness of display image can be increased by an increase in transmittance.

Heretofore, one embodiment of the present invention was described; however, the embodiment described above is merely an example of the present invention, and various applications and modifications may be made without departing from the scope of the present invention.

For example, in the embodiment described above, the transflector 21 provided with the open portions 21a was described by way of example; however, instead of forming the open portion 21a, a transflector 15 to 20 nm thick may be formed so as to serve as a transflector having a reflectance of approximately 85% and a transmittance of approximately 10%.

In addition, in the embodiment described above, the pixel electrodes 5 formed on the first substrate 2a were described by way of example; however, the pixel electrodes 5 may be formed on the second substrate 2b.

In the embodiment described above, the transflective liquid crystal device capable of performing reflective display and transmissive display was described by way of example; however, for example, this embodiment may be applied to a reflective liquid crystal device performing only reflective display or a transmissive liquid crystal device performing only transmissive display. When the present invention is applied to a reflective liquid crystal device and a transmissive liquid crystal device, particular structure and display operation thereof are equivalent to those in the case of the transflective liquid crystal device described above.

Figure 8:
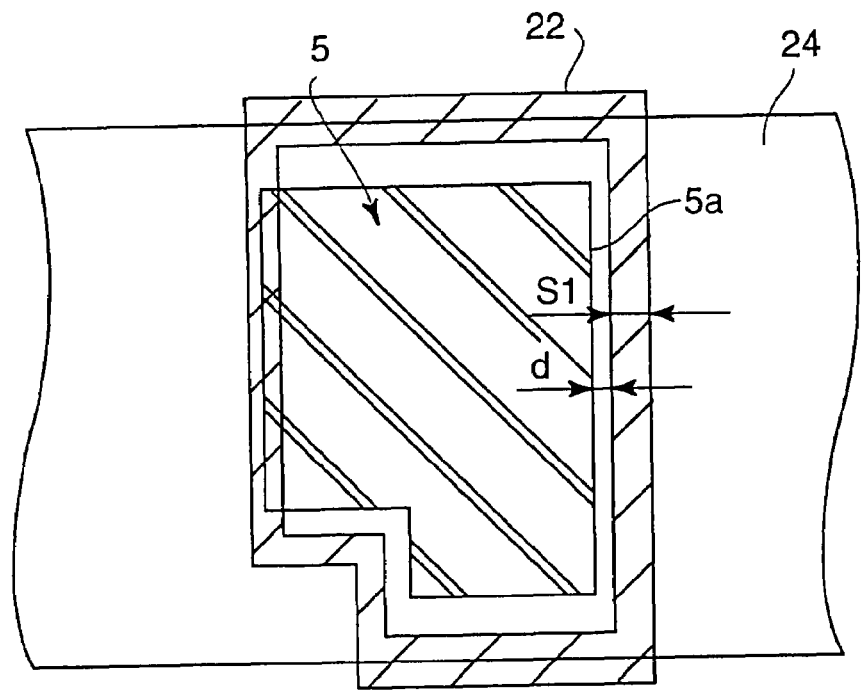
FIG. 8 includes views for illustrating modified examples of arrangement of a shading film 22.
Figure 8:
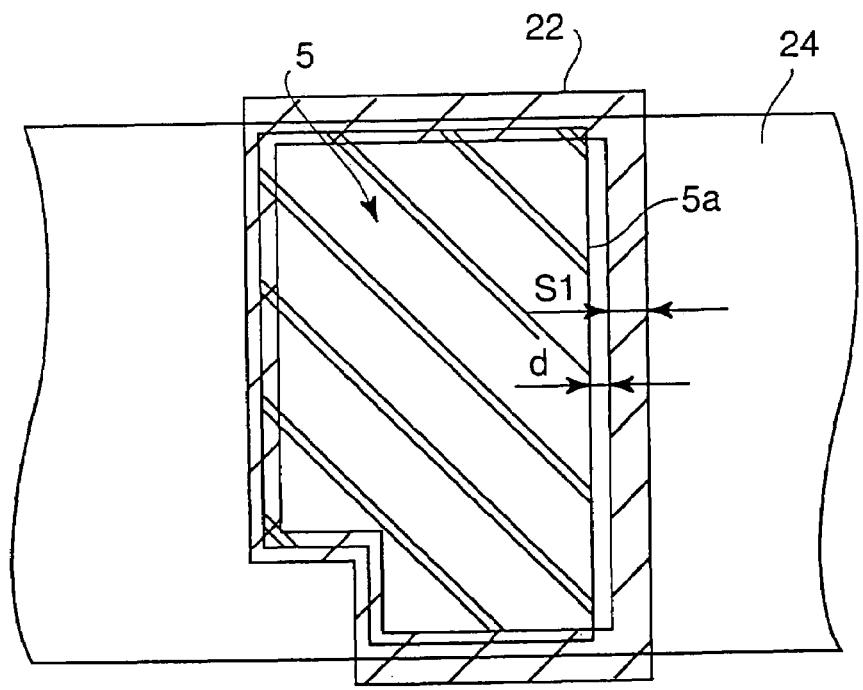

Furthermore, in the embodiment described above, as shown in FIG. 3, the shading film 22 is provided at a distance of d from a position corresponding to the periphery 5a of the pixel electrode 5; however, a shading film 22 having a shape shown by FIG. 8(a) or FIG. 8(b) may be provided on the second substrate 2b. That is, in the region b shown in FIG. 2, as long as the shading film 22 is not provided at a part of an area corresponding to the liquid crystal area which is driven by an oblique electric field, a shading film 22 of an any shape may be provided on the second substrate 2b.

Figure 9:
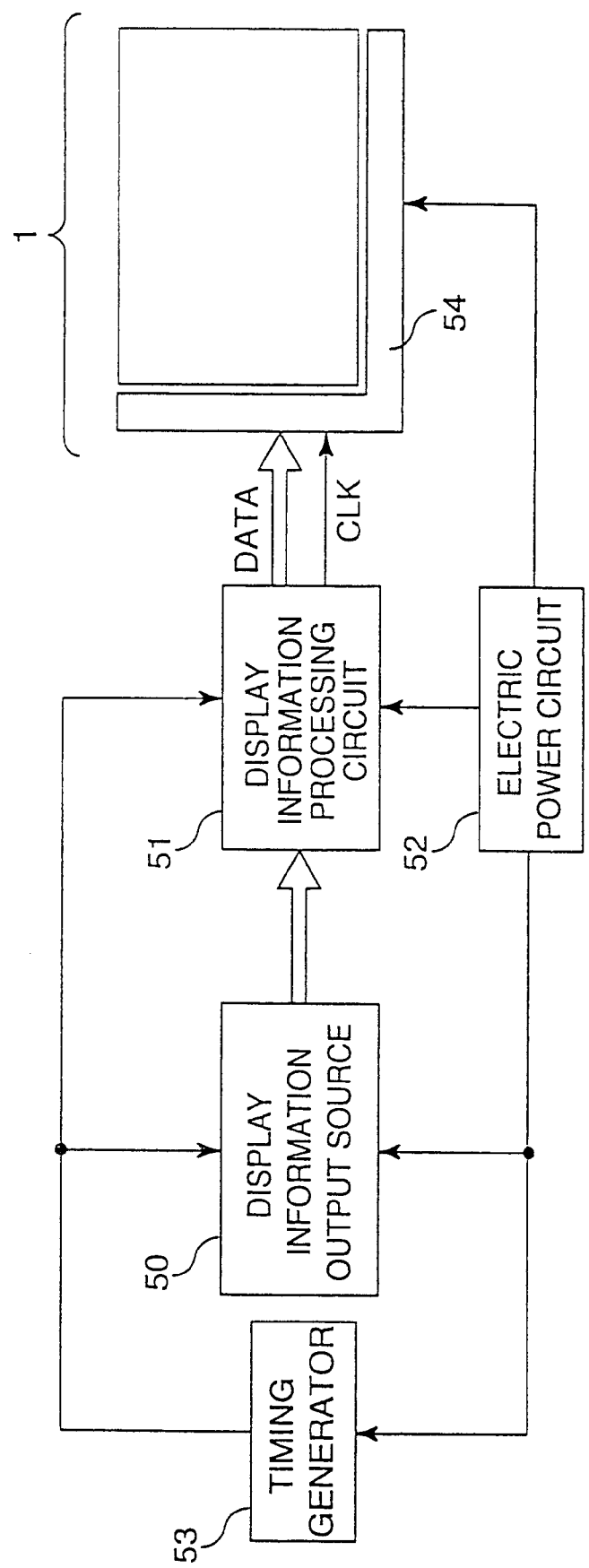
FIG. 9 is a block diagram showing an electrical structure of an electronic apparatus of an embodiment according to the present invention.

Next, cases in which the transflective liquid crystal device 1 of the present invention is applied to various electronic apparatuses will be described. In the cases described above, as shown in FIG. 9, the electronic apparatus is primarily composed of a display information output source 50, a display information processing circuit 51, an electric power circuit 52, a timing generator 53, the transflective liquid crystal device 1, and a drive circuit 54.

Among the constituent elements described above, the display information output source 50 includes memories such as a RAM (Random Access Memory), storage units such as various discs, and a synchronizing circuit which synchronizes and outputs digital image signals. In addition, in response to various clock signals produced by the timing generator 53, the display information output source supplies display information such as predetermined format image signals to the display information processing circuit 51. Next, the display information processing circuit 51 includes many known circuits, such as amplifier/inverter circuit, a rotation circuit, a gamma correction circuit, and a clamp circuit, executes processing of input display information, and supplies the image signals thereof to the drive circuit 54 together with clock signals CLK. A scanning line drive circuit (not shown) and a data line drive circuit (not shown) together with inspection circuits are collectively referred to as the drive circuit 54. In addition, the electric power circuit 52 supplies predetermined electric powers to the individual constituent elements.

Figure 10:
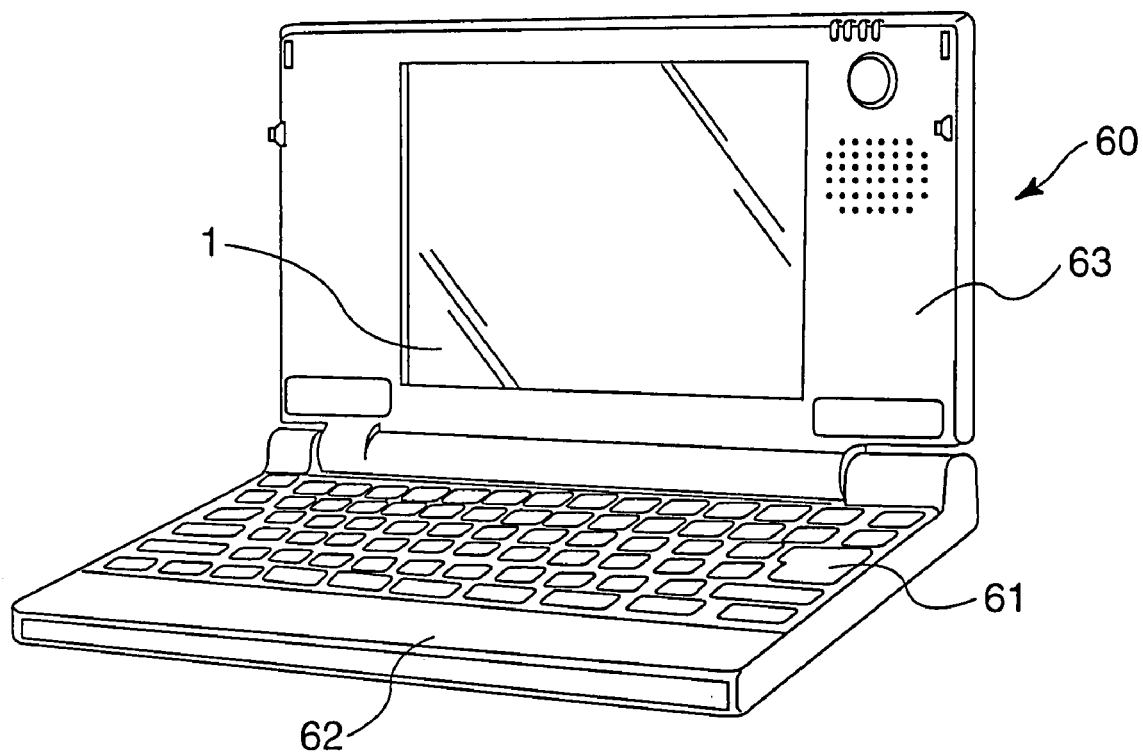
FIG. 10 is a perspective view showing an example of a personal computer which is an electronic apparatus of another embodiment according to the present invention.

Next, an example will be described in which the transflective liquid crystal device 1 of the embodiment described above is used in a particular electronic apparatus. First, an example in which the liquid crystal device is used in a mobile type personal computer will be described. FIG. 10 is a perspective view showing the structure of a personal computer. In this figure, a personal computer 60 consists of a main body 62 provided with a keyboard 61 and a liquid crystal display unit 63. This liquid crystal display unit 63 is composed of a transflective liquid crystal device 1 provided with a backlight. Accordingly, in places where external light cannot be used at all, by turning on the backlight, a display can be viewed.

Figure 11:
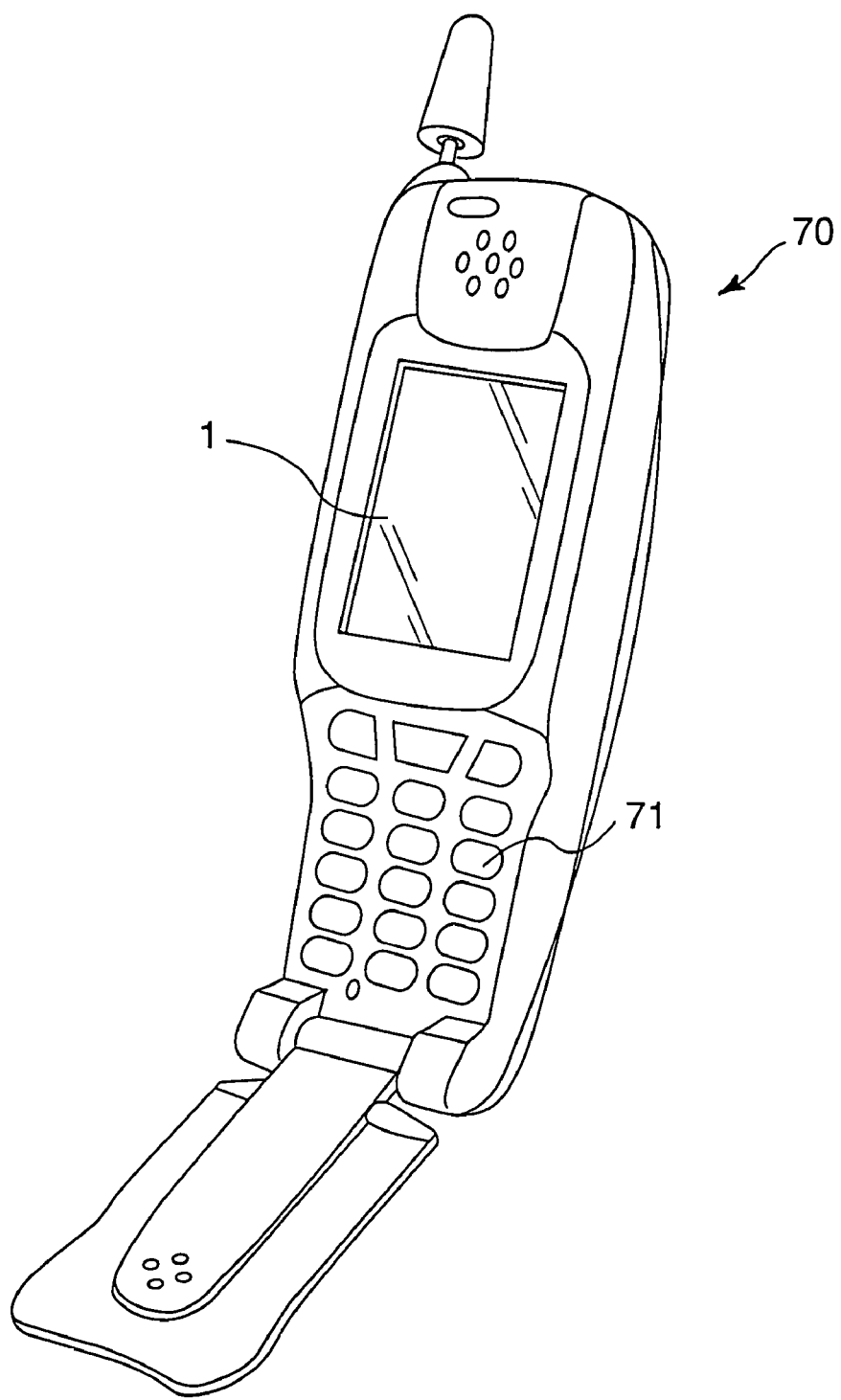
FIG. 11 is a perspective view showing an example of a mobile phone which is an electronic apparatus of still another embodiment according to the present invention.

In addition, an example will be described in which this transflective liquid crystal device 1 is used in a mobile phone. FIG. 11 is a perspective view showing the structure of a mobile phone 70. In this figure, the mobile phone 70 consists of a plurality of operation buttons 71 and the transflective liquid crystal device 1 described above. This transflective liquid crystal device 1 is also provided with a backlight.

In addition to the electronic apparatuses described above with reference to FIGS. 10 and 11, there may be mentioned a liquid crystal television, a viewfinder type and a direct viewing type video tape recorder, a car navigation apparatus, a pager, an electronic notebook, an electronic calculator, a word processor, a workstation, a television phone, a POS terminal, an apparatus provided with a touch panel, or the like. To the various electronic apparatuses described above, the transflective liquid crystal device can also be naturally applied.

Figure 13:
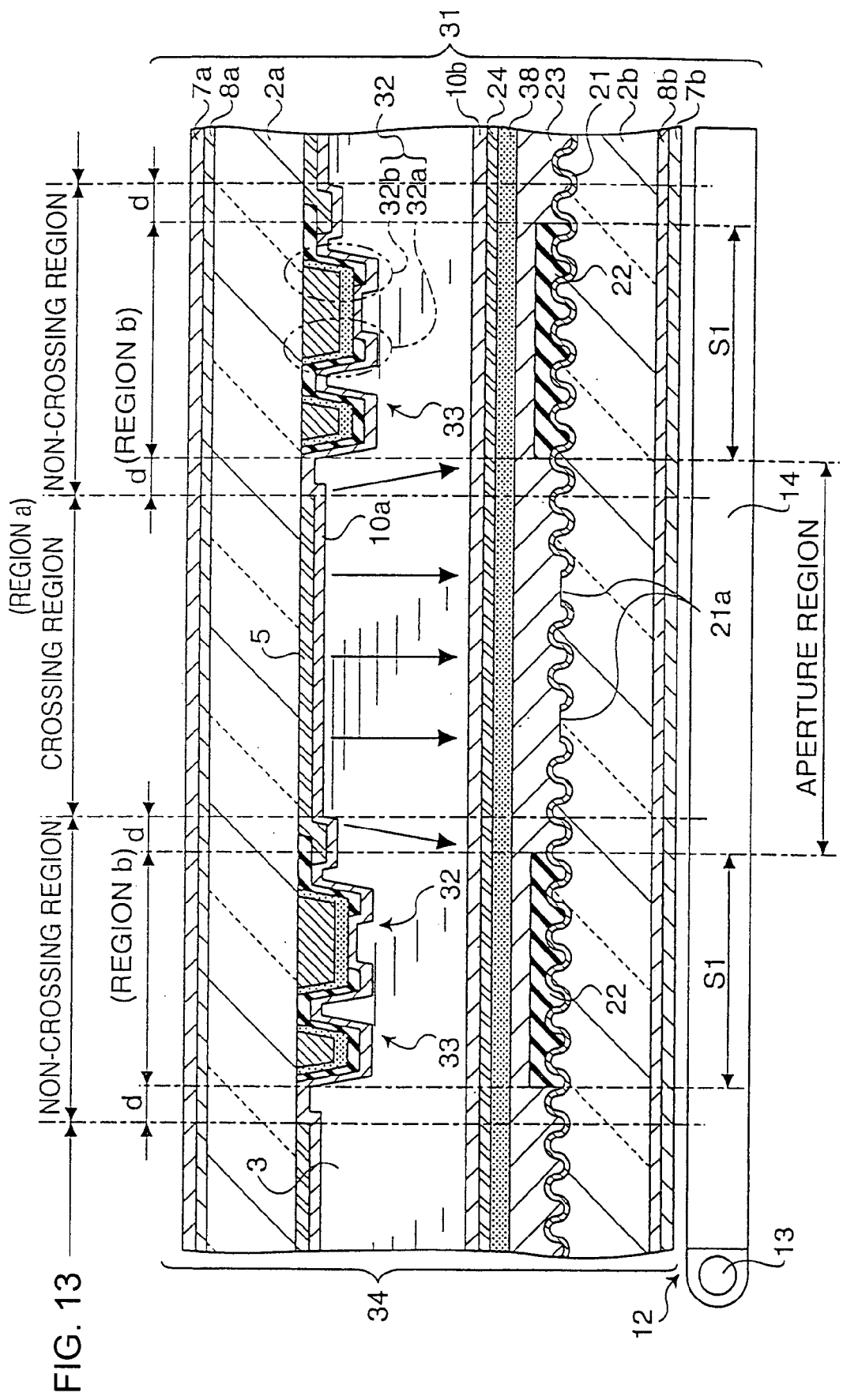
FIG. 13 is a view showing a cross-sectional structure of a liquid crystal device of another embodiment according to the present invention.

FIG. 13 shows a liquid crystal device of another embodiment according to the present invention, and more particularly, shows an embodiment in which the present invention is applied to an active matrix type transflective liquid crystal device using TFD elements as a switching element.

A liquid crystal device 31 shown in the figure has a liquid crystal cell 34 and a lighting device 12 used as a backlight. The lighting device 12 has a fluorescent tube 13 as a light source and a light guide body 14 which receives light from the fluorescent tube 13 and emits the light as planar light.

The liquid crystal cell 34 has a pair of substrates 2a and 2b which are bonded together at the peripheries thereof by a sealing material (not shown) so as to oppose each other, and liquid crystal is enclosed in a gap formed between the substrates 2a and 2b, that is, in a cell gap, whereby a liquid crystal layer 3 is formed.

On the surface of the first substrate 2a at the liquid crystal side, there are provided a plurality of TFD elements 32 each composed of a first TFD part 32a and a second TFD part 32b, a plurality of metal wires 33 each connected to one terminal of the TFD element 32, and a plurality of pixel electrodes 5 used as first electrodes each connected to the other terminal of each of the plurality of TFD elements 32. In addition, on the individual constituent elements described above, an alignment film 10a is formed. Orientation processing such as a rubbing treatment is performed for this alignment film 10a. On the outside surface of the first substrate 2a (that is, an upper side in FIG. 13), a retardation film 8a is formed, and on the surface thereof, a polarizer 7a is formed.

The plurality of metal wires is formed in parallel to each other on the surface of the first substrate 2a, that is, is formed in a stripe pattern. Along the metal wires 33, the TFD elements 32 are formed at regular intervals, and the pixel electrodes 5 are formed adjacent to the individual TFD elements 32. As a result, the plurality of pixel electrodes 5 is arranged in a dot matrix on the surface of the first substrate 2a.

In monochrome display without using a color filter, i.e., a color layer, one pixel electrode 5 generally forms one pixel. In a color display using color layers including three primary colors, such as R (red), G (green), and B (blue), or C (cyan), M (magenta), and Y (yellow), one pixel electrode 5 forms one pixel, and three color pixels, R, G, and B form one picture element.

Figure 15:
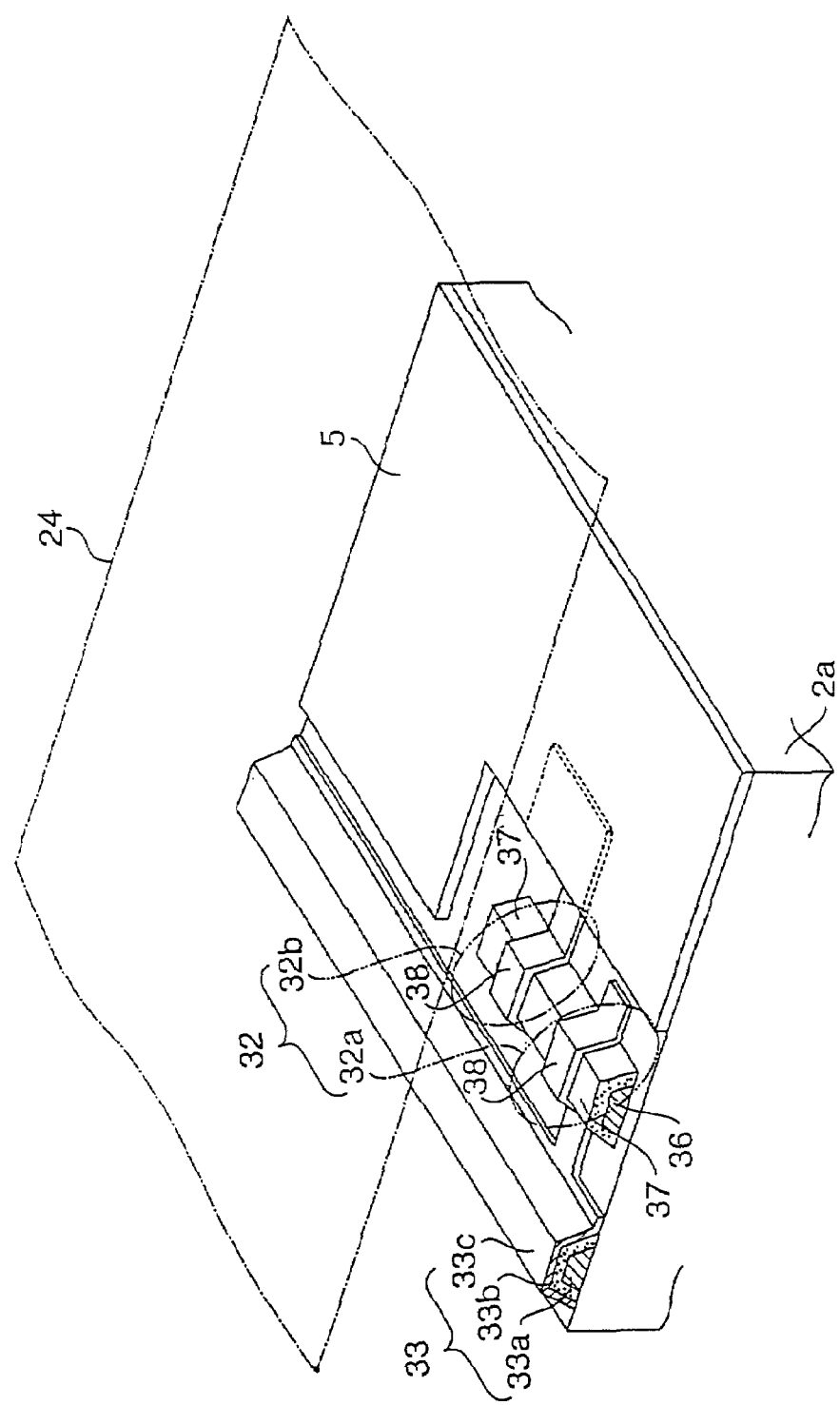
FIG. 15 is an enlarged perspective view showing one picture element portion or one pixel portion in the display area of the liquid crystal shown in FIG. 13.

A structure in the vicinity of the TFD element 32 is shown in FIG. 15 by way of example. A TFD element having a so-called back-to-back structure is shown in FIG. 15. In FIG. 15, the metal wire 33 has a three-layered structure composed of a first layer 33a formed of, for example, TaW (tantalum-tungsten), a second layer 33b formed of, for example, an anodized film, $Ta_2O_5$ (tantalum oxide), and a third layer 33c formed of, for example, Cr.

In addition, the first TFD part 32a and the second TFD part 32b, which form the TFD element 32, each have a three-layered structure composed of a first metal layer 36 formed of TaW, an insulating layer 37 composed of $Ta_2O_5$ formed by anodization, and a second metal layer 38 formed of Cr, which is the same layer as the third layer 33c of the metal wire 33.

When the first TFD part 32a is viewed from the metal wire 33 side, a laminated structure of the second metal layer 38/the insulating layer 37/the first metal layer 36 is formed, and when the second TFD part 32b is viewed from the metal wire 33 side, a laminated structure of the first metal layer 36/the insulating layer 37/the second metal layer 38 is formed. As described above, a pair of TFD parts 32a and 32b is oppositely connected electrically in series so as to form a TFD element having a back-to-back structure, and hence, the switching properties of the TFD element can be stabilized. The pixel electrode 5 is formed of, for example, ITO so as to be connected to the second metal layer 38 of the second TFD part 32b.

In FIG. 13, at the liquid crystal side of the second substrate 2b, a transflector 21, a shading film 22 used as a black mask or a black matrix, color filter films, i.e., color layers 23, an overcoat film 38, counter electrodes 24, and an alignment film 10b are sequentially formed in this order. A transflector 21 opposing the pixel electrode 5 is provided with at least one aperture 21 at an appropriate position. In addition, on the outside surface of the second substrate 2b, a retardation film 8b is formed, and on the surface thereof, a polarizer 7b is formed.

In FIG. 13, the plurality of metal wires 33 each extends in the direction perpendicular to the plane of this figure, and on the other hand, the plurality of counter electrodes 24 each extends in the lateral direction in FIG. 13 to cross the metal wires 33, and counter electrodes adjacent to each other are arranged in parallel so that the whole is formed into a stripe pattern.

Areas at which the pixel electrodes 5 exist, that is, electrode existing areas, form crossing regions with the counter electrodes 24. Each of the crossing regions forms one pixel, and each color pattern of the color layer 23 corresponds to one pixel. The color layer 23 is formed of, for example, three primary colors, R (red), G (green), and B (blue), which form one unit for forming one picture element. That is three pixels form one unit for forming one picture element.

The first substrate 2a and the second substrate 2b are formed of, for example, a glass or a plastic. In addition, the transflector 21 is formed of a light reflective material such as Al (aluminum). In order to obtain both light transmissive and light reflective properties, for example, a process may be performed in which the thickness of the transflector 21 is reduced or an open portion for light transmittance is provided at an appropriate position in the transflector 21. In this embodiment, a plurality of open portions 21a is provided.

The color layers 23 are formed by applying a pigment using a known method for forming color picture elements, for example, an inkjet method or a pigment-dispersing method, to an optional pattern, such as a mosaic arrangement, a stripe arrangement, or a delta arrangement. In addition, the overcoat film 38 is formed by uniform coating of an optional transmissive resin material using, for example, a spin coating method or a roll coating method.

The pixel electrodes 5 and the counter electrodes 24 are formed by a step of forming a film composed of, for example, ITO (Indium Tin Oxide), by a known film-forming method, such as a sputtering method or a vacuum deposition method, and a subsequent step of patterning the film by a photoetching method, whereby a desired pattern of the electrodes are formed. The alignment films 10a and 10b are formed by a method, such as a method of applying a polyimide solution followed by firing or an offset printing method.

Figure 14:
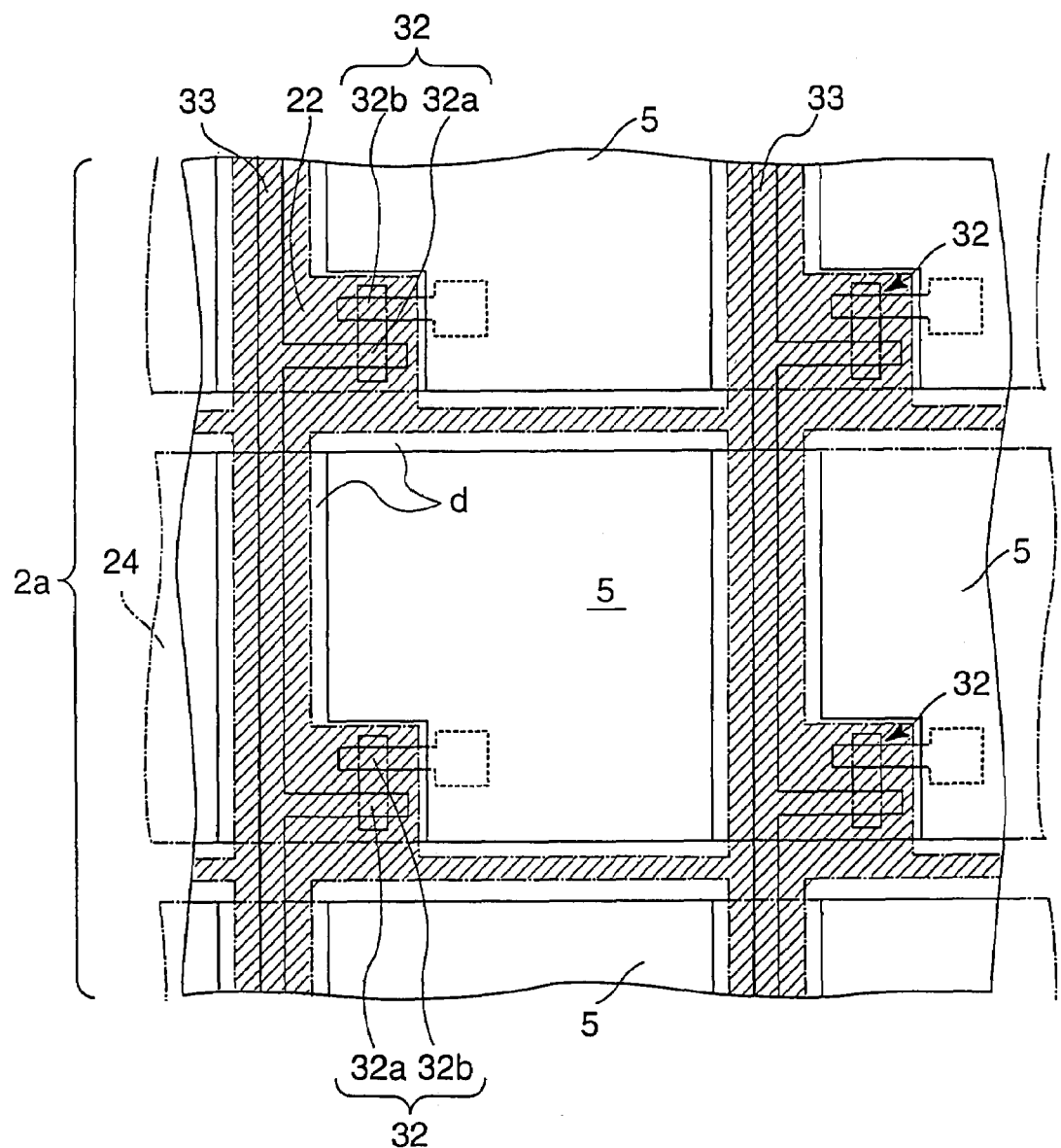
FIG. 14 is an enlarged plan view showing one picture element portion or one pixel portion in a display area of the liquid crystal shown in FIG. 13.

In this embodiment, the shading film 22 is formed of a shading material such as chromium or chromium oxide and serves to shade light so as to prevent the degradation of contrast. The line width S1 of the shading film 22 of this embodiment is designed to be smaller than the line width S0 of the shading film 132 used in the conventional liquid crystal device 100 shown in FIG. 12 by a length "d" at each side. The shading film 22 thus designed is provided at a distance of "d" from the crossing region of the pixel electrode 5 and the counter electrode 24 as shown in FIG. 13. In addition, this shading film 22 is disposed in an area indicated by oblique lines in FIG. 14 when viewed in plan view. As shown in the figure, the shading film 22 covers the TFD elements 32 used as a switching element.

The liquid crystal device 31 according to this embodiment performs reflective display and transmissive display by driving liquid crystal in the crossing region, i.e., in the region a, and by driving liquid crystal in a region which is a part of the non-crossing region and is in the vicinity of the crossing region, i.e., in the region b. In the device described above, light passed through the region b when a voltage is applied is absorbed by the polarizer 7a and the like since the liquid crystal in the region b is driven. Accordingly, at a position of the second substrate 2b corresponding to the region b, it is not necessary to provide the shading film 22. As a result, the line width of the shading film 22 can be designed to be smaller than that of the conventional one, and a high aperture ratio can be achieved. In other words, when reflective display is performed, the display image can be brighter due to improved reflectance, and when transmissive display is performed, the display image can also be brighter due to improved transmittance.

Figure 16:
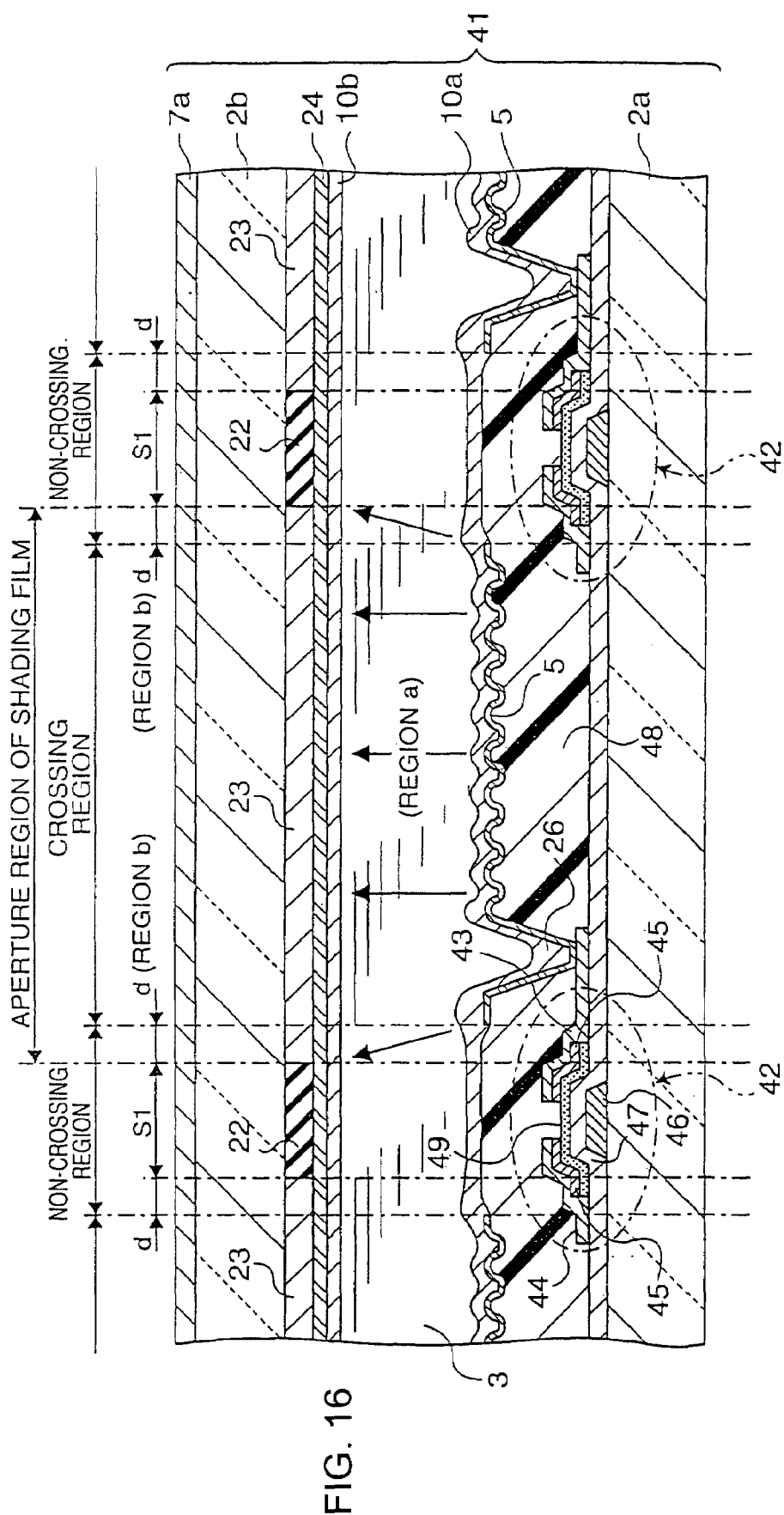
FIG. 16 is a view showing a cross-sectional structure of a liquid crystal device of still another embodiment according to the present invention.

FIG. 16 is a view showing a liquid crystal device of still another embodiment according to the present invention and, more particularly, showing the embodiment in which the present invention is applied to an active matrix type reflective liquid crystal device using TFT (Thin Film Transistor) elements, which is a three-terminal active element, as a switching element.

A liquid crystal device 41 shown in this figure is formed by steps of bonding a first substrate 2a and a second substrate 2b by a sealing material at the peripheries thereof, and enclosing liquid crystal in a gap formed by the first substrate 2a, the second substrate 2b, and the sealing material so as to form a liquid crystal layer 3.

The first substrate 2a is formed of a glass, a plastic, or the like. TFT (Thin Film Transistor) elements 42, an active element used as a switching element, are formed on the first substrate 2a, and pixel electrodes 5 used as first electrodes are provided above the TFT elements 42 with an organic insulating films 48 provided therebetween. On the pixel electrodes 5, an alignment film 10a is formed, and rubbing treatment is performed on this alignment film 10a. The pixel electrode 5 is formed of a light reflective conductive material, such as Al (aluminum) or Ag (silver).

The second substrate 2b opposing the first substrate 2a is formed of a glass, a plastic, or the like, and on this second substrate 2b, color filters, i.e., color layers 23, are formed. In addition, there are provided a counter electrode 24 used as a second electrode on the color layers 23 and an alignment film 10b on the counter electrode 24. The counter electrode 24 is a sheet-shaped electrode which is composed of ITO (Indium Tin Oxide) or the like and is formed on the entire area of the second substrate 2b.

The color layers 23 each has one color filter element, such as R (red), G (green), and B (blue), or C (cyan), M (magenta), and Y (yellow), at positions opposing the pixel electrodes 5 provided at the first substrate 2a side. At positions which are adjacent to the color layers 23 and do not oppose the pixel electrodes 5, a black mask or a black matrix, that is a shading film 22, is provided.

Figure 12:
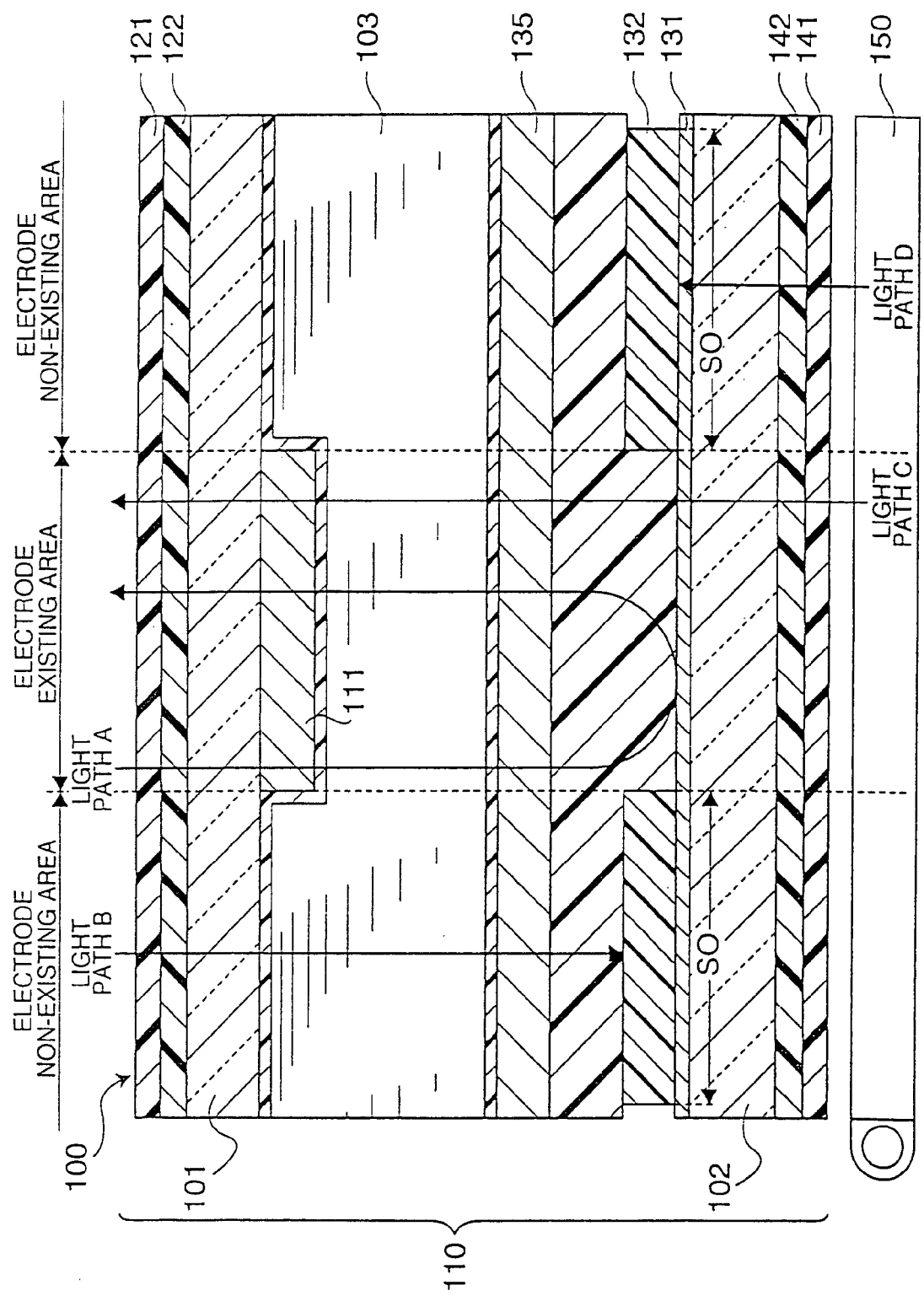
FIG. 12 is a view showing a cross-sectional structure of an example of a conventional liquid crystal device.
Figure 17:
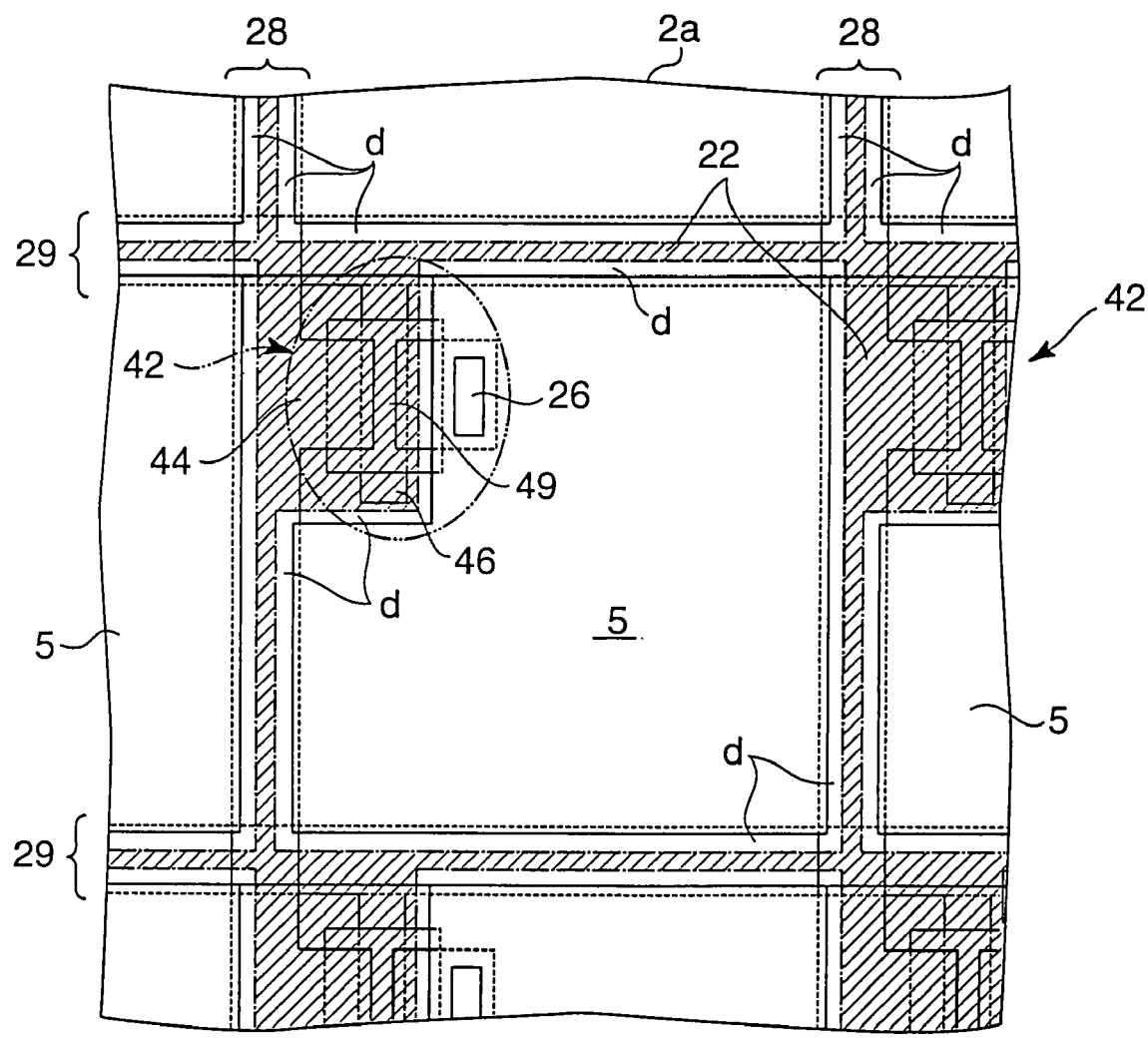
FIG. 17 is an enlarged plan view showing one picture element portion or one pixel portion in a display area of the liquid crystal shown in FIG. 16.

In this embodiment, the line width S1 of the shading film 22 is designed to be smaller than the line width S0 of the shading film 132 used for the conventional liquid crystal device 100 shown in FIG. 12 by a length "d" at each side. The shading film 22 thus designed is provided at a distance of "d" from the crossing region of the pixel electrode 5 and the counter electrode 24 as shown in FIG. 16. In addition, the shading film 22 is disposed in an area shown by oblique lines in FIG. 17 when viewed in plan view. As shown in FIG. 17, the shading film covers the TFT elements 42 used as switching elements.

The TFT element 42 comprises a gate electrode 46 formed on the first substrate 2a, a gate insulating film 47 which is formed on the gate electrode 46 and which covers the entire area of the first substrate 2a, a semiconductor layer 49 provided above the gate electrode 46 with the gate insulating film 47 provided therebetween, a source electrode 44 disposed at one side of the semiconductor layer 49 with a contact electrode 45 provided therebetween, and a drain electrode 43 at the other side of the semiconductor layer 49 with a contact electrode 44 provided therebetween.

As shown in FIG. 17, the gate electrode 46 is extended from the gate bus line 29. In addition, the source electrode 44 is extended from the source bus line 28. A plurality of the gate bus lines 29 is formed in the lateral direction of the first substrate 2a and is disposed in parallel to each other at regular intervals in the longitudinal direction. A plurality of source bus lines 28 is formed in the longitudinal direction so as to cross the gate bus lines 29 with the gate insulating film 47 (see FIG. 16) provided therebetween and is disposed in parallel to each other at regular intervals in the lateral direction.

The gate bus line 29 is connected to a liquid crystal driving IC (not shown) and is used as, for example, a scanning line, and the source bus line 28 is connected to another liquid crystal driving IC (not shown) and is used as, for example, a signal line. In addition, as shown in FIG. 17, the pixel electrode 5 is formed in a square area formed by the gate bus line 29 and the source bus line 28 excluding an area at which the TFT element 42 is formed.

The gate bus line 29 and the gate electrode 46 are formed of, for example, chromium or tantalum. The gate insulating film 47 is formed of, for example, silicon nitride ($SiN_x$) or silicon oxide ($SiO_x$). The semiconductor layer 49 is formed of, for example, a-Si, polysilicon, or CdSe. The contact electrode 45 is formed of, for example, a-Si. The source electrode 44, the source bus line 28 integral therewith, and the drain electrode 43 are formed of, for example, titanium, molybdenum, or aluminum.

The organic insulating film 48 is formed over the entire area of the first substrate 2a so as to cover the gate bus lines 29, the source bus lines 28, and the TFT elements 42. However, a contact hole 26 is formed in the organic insulating film 48 at a position corresponding to the drain electrode 43, and via the contact hole 26, the pixel electrode 5 and the drain electrode 43 of the TFT element 42 are electrically connected to each other. On an organic insulating film 48 on which the pixel electrode 5 is formed, an irregular pattern formed of regularly or irregularly repeated concavo-convex pattern is formed. As a result, the pixel electrode 5 formed on the organic insulating film 48 has a light reflective pattern having an irregular pattern similar to that described above.

Since the liquid crystal device of this embodiment has the structure described above, in FIG. 16, external light from the observer side, that is, external light entered into the liquid crystal device 41 from the second substrate 2b side passes through the liquid crystal 3 and reaches the pixel electrode 5 formed of a light reflective material, and subsequently, the light is reflected at the electrode 5 and again enters the liquid crystal 3. The orientation of the liquid crystal 3 is controlled in each pixel by a voltage applied between the counter electrode 24 and the pixel electrode 5 selected by a scanning signal and a data signal. Consequently, the reflected light entered into the liquid crystal is modulated in each pixel, and letters, numerals, and the like are thereby displayed.

In the liquid crystal device 41 of this embodiment, liquid crystal in a crossing region, i.e., in the region a, and liquid crystal in a region which is a part of a non-crossing region and is in the vicinity of the crossing region, i.e., in the region b, are driven, whereby reflective display is performed. In this embodiment, light passed through the region b when a voltage is applied is absorbed in a polarizer 7a and the like since the liquid crystal in the region b is driven. Accordingly, at a position of the second substrate 2b corresponding to the area b, it is not necessary to provide the shading film 22. Accordingly, the line width of the shading film 22 can be designed to be smaller than that of a conventional one, and hence, a high aperture ratio can be obtained. In other words, when reflective display is performed, a display image can be brighter due to improved reflectance.

In the first substrate 2a shown in FIG. 16, since the height of a position at which the TFT element 42 is formed is increased corresponding to the thickness of the TFT element 42, a cell gap at the position is smaller than that at the other positions. In this embodiment, since the region b in which an oblique electric field is generated is included in the position described above, the intensity of the oblique electric field is increased corresponding to the decreased of cell gap, and hence, a sufficient shading effect can be obtained even when the line width of the shading film 22 is further decreased. In the case described above, when the line width of the shading film is further decreased, the aperture ratio can be further increased, and hence, an even brighter display can be created.

As has thus been described, according to the present invention, since an oblique electric field generated between the periphery of the first electrode such as a pixel electrode and the second electrode such as a counter electrode is used for driving liquid crystal, the shading film can be designed to be smaller, and as a result, the aperture ratio can be increased.

What is claimed is:

1. A liquid crystal device comprising:
a pair of substrates;
a liquid crystal layer between the substrates;
an electrode;
a reflector that overlaps the electrode in plan view at an overlapping region;
a shading film laterally spaced from the overlapping region in plan view so that an edge of the shading film is separated from an edge of the overlapping region by a gap,
wherein the electrode serves as a common electrode and the reflector serves as a pixel electrode.

2. A liquid crystal device comprising:
a pair of substrates;
a liquid crystal layer between the substrates;
an electrode;
a reflector that overlaps the electrode in plan view at an overlapping region;
a shading film laterally spaced from the overlapping region in plan view so that an edge of the shading film is separated from an edge of the overlapping region by a gap; and
a thin-film transistor that controls application of voltage to the reflector,
wherein the electrode serves as a common electrode and the reflector serves as a pixel electrode.

3. A liquid crystal device comprising:
a pair of substrates;
a liquid crystal layer between the substrates;
an electrode;
a reflector that overlaps the electrode in plan view at an overlapping region;
a shading film laterally spaced from the overlapping region in plan view so that an edge of the shading film is separated from an edge of the overlapping region by a gap; and
another reflector adjacent to the reflector, the reflector and the another reflector serving as pixel electrodes of adjacent pixels in a pixel matrix, the shading film being laterally positioned between the reflector and the another reflector in plan view.

4. A liquid crystal device comprising:
a pair of substrates;
a liquid crystal layer between the substrates;
an electrode;
a reflector that overlaps the electrode in plan view at an overlapping region;
a shading film laterally spaced from the overlapping region in plan view so that an edge of the shading film is separated from an edge of the overlapping region by a gap,
wherein the electrode and the reflector are disposed on opposite sides of the liquid crystal layer.

* * * * *